United States Patent
Xu

(10) Patent No.: US 9,939,770 B2
(45) Date of Patent: Apr. 10, 2018

(54) IMAGE READING APPARATUS AND IMAGE FORMING SYSTEM

(71) Applicant: KONICA MINOLTA, INC., Chiyoda-ku, Tokyo (JP)

(72) Inventor: Tianzi Xu, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 22 days.

(21) Appl. No.: 15/437,507

(22) Filed: Feb. 21, 2017

(65) Prior Publication Data
US 2017/0277100 A1    Sep. 28, 2017

(30) Foreign Application Priority Data
Mar. 25, 2016  (JP) ................. 2016-061777

(51) Int. Cl.
*H04N 1/04* (2006.01)
*G03G 15/00* (2006.01)
*H04N 1/00* (2006.01)

(52) U.S. Cl.
CPC ........... *G03G 15/607* (2013.01); *G03G 15/70* (2013.01); *H04N 1/0061* (2013.01); *H04N 1/00602* (2013.01); *H04N 1/00687* (2013.01); *G03G 2215/00177* (2013.01); *G03G 2215/00341* (2013.01); *H04N 2201/0081* (2013.01)

(58) Field of Classification Search
CPC .............................. G03G 15/607; G03G 16/70
USPC ....... 358/408, 406, 504, 461, 474, 496, 400, 358/500, 505; 250/239
See application file for complete search history.

(56) References Cited

U.S. PATENT DOCUMENTS

| | | | | |
|---|---|---|---|---|
| 5,101,284 A | * | 3/1992 | Tanabe | H04N 1/04 358/461 |
| 9,769,353 B2 | * | 9/2017 | Yoshita | H04N 1/00891 |
| 2005/0243382 A1 | * | 11/2005 | Wang | H04N 1/121 358/461 |
| 2007/0223062 A1 | * | 9/2007 | Tanaka | H04N 1/03 358/497 |
| 2010/0290093 A1 | * | 11/2010 | Ito | H04N 1/504 358/461 |
| 2012/0008175 A1 | * | 1/2012 | Liao | H04N 1/00031 358/474 |
| 2012/0099873 A1 | * | 4/2012 | Ninomiya | G03G 15/04036 399/15 |
| 2013/0258420 A1 | * | 10/2013 | Nakaie | G03G 15/5062 358/474 |
| 2015/0061209 A1 | * | 3/2015 | Hachisuga | B65H 15/00 271/3.19 |
| 2016/0263895 A1 | * | 9/2016 | Kuri | B41J 2/165 |
| 2016/0360073 A1 | * | 12/2016 | Hatayama | H04N 1/6075 |

FOREIGN PATENT DOCUMENTS

| | | |
|---|---|---|
| JP | 2001183957 A | 7/2001 |
| JP | 2005173171 A | 6/2005 |

* cited by examiner

*Primary Examiner* — Cheukfan Lee
(74) *Attorney, Agent, or Firm* — Holtz, Holtz & Volek PC

(57) ABSTRACT

An image reading apparatus includes a first scanner provided in a housing, a conveyance unit, and a first calibration member. The conveyance unit is provided with a separation unit which separates the first calibration member upward from the first scanner. When the first calibration member is separated, the separation unit releases connection between the conveyance unit and the housing.

10 Claims, 20 Drawing Sheets

WITHDRAWING DIRECTION

IMAGE READING APPARATUS AND IMAGE FORMING SYSTEM

CROSS-REFERENCE TO RELATED APPLICATIONS

The present application claims priority under 35 U.S.C. § 119 to Japanese Patent Application No. P2016-061777, filed Mar. 25, 2016. The contents of this application are herein incorporated by reference in their entirety.

BACKGROUND OF THE INVENTION

Field of the Invention

The present invention relates to an image reading apparatus and an image forming system.

Description of Related Art

Conventionally, in a copying machine or the like capable of reading images, maintenance work is performed by taking out a unit to be maintained. For example, it has been proposed to locate a paper conveying section in a low position of an apparatus for improving the operability of replacing a toner cartridge (for example, refer to Japanese Patent Published Application No. 2005-173171).

On the other hand, for example, it has been proposed to retract an intermediate transfer belt in a position where the intermediate transfer belt does not come in contact with a photoreceptor member when replacing an intermediate transfer unit (for example, refer to Japanese Patent Published Application No. 2001-183957).

Meanwhile, in the case where a scanner is directly linked with a calibration member which is located to face the scanner, flickers may occur in a read image because of vibration due to rotation of the calibration member, vibration occurring when a sheet collides with the calibration member, vibration occurring when a sheet collides with a conveying route or the like vibration transmitted to the scanner. The reading accuracy of the scanner is thereby lowered to degrade the image quality.

Also, in the case where a scanner is not directly linked with a calibration member which is located to face the scanner, when withdrawing the scanner and a conveyance unit on which the calibration member is mounted, the conveyance unit may be lowered by its own weight. The scanner and the calibration member may interfere with each other.

On the other hand, when the calibration member is separated from the scanner by drawing the calibration member upward obliquely, there has to be reserved a certain space in an apparatus to increase the whole size of the apparatus for the purpose of preventing the calibration member from interfering with a member located upward obliquely. It is thereby desired that the calibration member is designed to be withdrawn in the horizontal direction in order to avoid enlargement of the entire apparatus.

The present invention is made in order to solve such a prior art problem and it is an object of the present invention to provide an image reading apparatus and an image forming system capable of preventing image quality from being degraded, and a scanner and a calibration member from interfering with each other.

SUMMARY OF THE INVENTION

To achieve at least one of the above-mentioned objects, reflecting one aspect of the present invention, an image reading apparatus conveys a sheet having a first side facing upward and a second side facing downward along a conveying route formed in a housing, reads an image formed on the sheet, and comprises: a first scanner provided in the housing, arranged below the conveying route, and structured to read an image formed on the second side of the sheet; a conveyance unit provided in the housing, and capable of being withdrawn from the housing; and a first calibration member connected to the conveyance unit, arranged above the first scanner, and structured to reflect light which is radiated from the first scanner, wherein the conveyance unit is provided with a separation unit which separates the first calibration member upward from the first scanner, and wherein when the first calibration member is separated, the separation unit releases connection between the conveyance unit and the housing.

Preferably, the image reading apparatus of the present invention further comprises: a second scanner arranged above the conveying route and structured to read an image formed on the first side of the sheet; and a second calibration member arranged below the second scanner, and structured to reflect light which is radiated from the second scanner, wherein the first scanner and the first calibration member are located in either one of an upstream side and a downstream side of the conveying route, and wherein the second scanner and the second calibration member are located in the other of the upstream side and the downstream side of the conveying route.

Also, in accordance with the image forming apparatus of the present invention, it is preferred that the separation unit comprises: an operation section; a transmission section structured to hold the operation member in order to transmit the operation of the operation member; and a support member structured to support the first calibration member, and move the first calibration member upward or downward in response to the operation of the operation section transmitted through the transmission section.

Furthermore, preferably, the image reading apparatus of the present invention further comprises: detection sections located at both an entrance side and an exit side of the conveying route to detect existence of a sheet P, wherein the separation unit further comprises an operation lock section which sets the operation member in either one of a state in which the operation member can be operated and a state in which the operation member cannot be operated, and wherein the operation lock section makes it possible to operate the operation member when the detection sections detect that there is no sheet at either the entrance side or the exit side of the conveying route respectively.

Still further, preferably, the image reading apparatus of the present invention further comprises: a unit lock section provided between the housing and the conveyance unit, and structured to change connection between the conveyance unit and the housing to either a locked state or an unlocked state in response to the operation of the operation section, wherein when the first calibration member is moved upward by the operation of the operation section, the unit lock section changes connection between the conveyance unit and the housing to the unlocked state.

Still further, preferably, the image reading apparatus of the present invention further comprises: the separation unit further comprises a separation lock section which changes the transmission section to a locked state when the first calibration member is moved upward.

Still further, in accordance with the image forming apparatus of the present invention, it is preferred that the separation unit further comprises a positioning member which determines the positional relationship between the first calibration member and the first scanner, and wherein when the first calibration member is lowered downward, the positioning member determines the position of the first calibration member in a reading position in which the reading accuracy of the first scanner can be maintained.

Still further, in accordance with the image forming apparatus of the present invention, it is preferred that the positioning member is provided with a guide section which guides the first calibration member in the reading position of the first scanner, wherein the first calibration member is provided with a shaft member which is guided to the reading position along the guide section, wherein the separation unit further comprises: an intervening member located between the support members and the first calibration member to transmit motion of the support members to the first calibration member; and a resilient member located between the intervening member and the first calibration member to cancel motion of the first calibration member.

Still further, preferably, the image reading apparatus of the present invention further comprises: a spectrophotometer structured to colorimetrically measure an image formed on the first side of the sheet, wherein the reading result of the first scanner or the second scanner is associated with the colorimetric measurement result of the spectrophotometer.

BRIEF DESCRIPTION OF THE DRAWINGS

FIG. 28 is a view for explaining collision of the first calibration member 705a of the embodiment of the present invention with a first scanner 701a.

DETAILED DESCRIPTION OF THE PREFERRED EMBODIMENT

In what follows, an embodiment of the present invention will be explained with reference to drawings. However, the present invention is not limited to the following specific embodiments.

Figure 1:
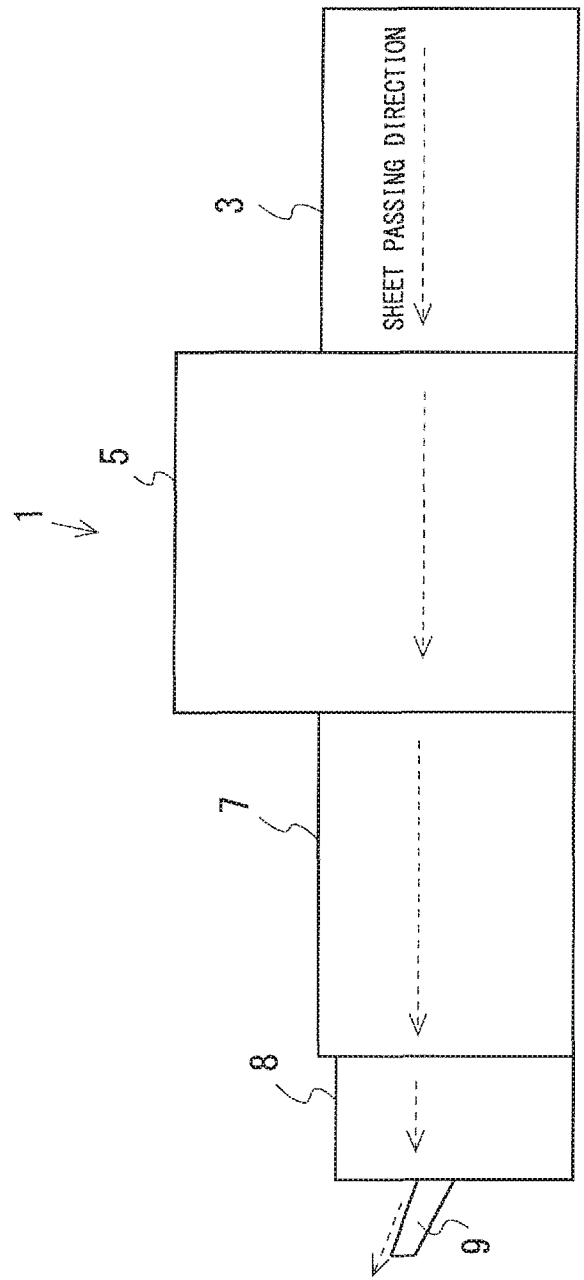
FIG. 1 is a schematic diagram for showing an example of the overall configuration of an image forming system 1 in accordance with an embodiment of the present invention.

FIG. 1 is a schematic diagram for showing an example of the overall configuration of an image forming system 1 in accordance with an embodiment of the present invention. As illustrated in FIG. 1, the image forming system 1 includes a paper feed apparatus 3, an image forming apparatus 5, an image reading apparatus 7 and a discharge section 8. The paper feed apparatus 3 feeds a sheet P to the image forming apparatus 5. The image forming apparatus 5 forms an image on a sheet P fed by the paper feed apparatus 3. The image reading apparatus 7 reads a sheet P on which an image is formed by the image forming apparatus 5, and performs various types of processing. The discharge section 8 is provided with a catch tray 9, and discharges a sheet P, which is conveyed from the image reading apparatus 7, to the catch tray 9.

Figure 2:
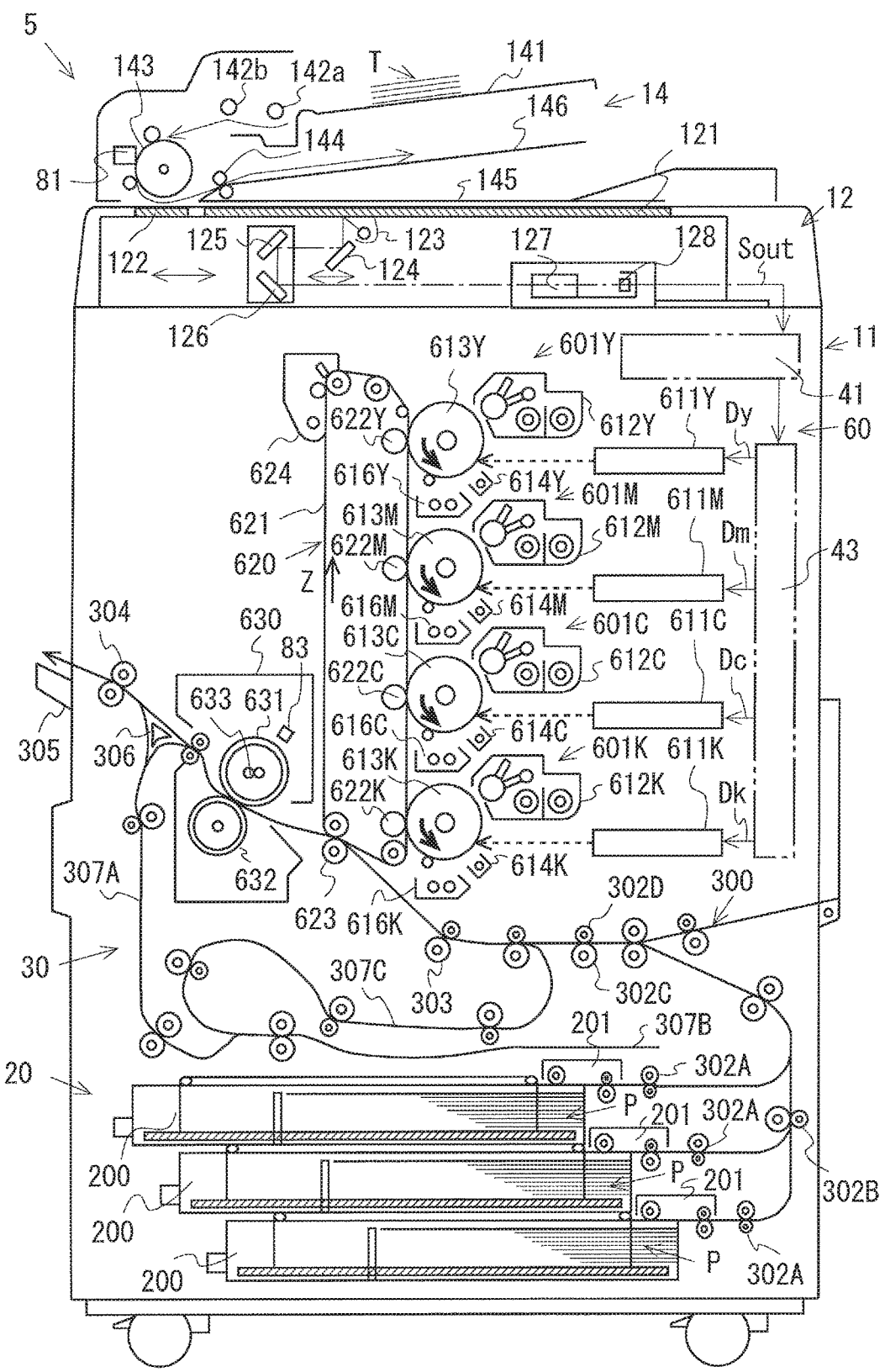
FIG. 2 is a view for showing an exemplary structure of an image forming apparatus 5 in accordance with the embodiment of the present invention.

FIG. 2 is a view for showing an exemplary structure of the image forming apparatus 5 in accordance with the embodiment of the present invention. As shown in FIG. 2, the image forming apparatus 5 is an example of a color copying machine. The image forming apparatus 5 acquires image information by reading images formed on an original T. The image forming apparatus 5 superimposes respective colors based on the acquired image information to form a full color image. Besides such a color copying machine, the image forming apparatus 5 can be applied to a color printer, a facsimile machine or a multi-functional peripheral thereof.

The image forming apparatus 5 is provided with an image forming apparatus body 11. A color image reading section 12 and an automatic document feeder 14 are installed on the top of the image forming apparatus body 11. As described in detail below, the image forming apparatus body 11 includes a control section 41, an image processing section 43, an image forming section 60, a paper feed section 20 and a conveyance section 30.

The automatic document feeder 14 is located on the image reading section 12 The automatic document feeder 14 performs an operation of automatically feeding one or more original T in an automatic feeding mode. The automatic feeding mode is a mode for feeding an original T placed on the automatic document feeder 14, and reading an image printed on the original T.

More specifically, the automatic document feeder 14 is provided with an original placing member 141, a roller 142*a*, a roller 142*b*, a roller 143, a roller 144, a sheet reversing member 145 and a discharge tray 146. One or more original T is placed on the original placing member 141. The roller 142*a* and the roller 142*b* are located in the downstream side of the original placing member 141. The roller 143 is located in the downstream side of the roller 142*a* and the roller 142*b*. The automatic document feeder 14 is provided with a positioning sensor 81 on the outer circumference of the roller 143.

When the automatic feeding mode is selected, an original T fed from the original placing member 141 is conveyed by the roller 143 to form a U-shaped turn. Preferably, when the automatic feeding mode is selected, an original T is placed on the original placing member 141 with its printed side facing up.

After reading by the image reading section 12, the original T is conveyed by the roller 144 and discharged onto the discharge tray 146. Meanwhile, the automatic document feeder 14 can convey the original T through the sheet reversing member 145 to read not only the printed side of the original T but also the opposite side to the printed side of the original T with the image reading section 12.

The positioning sensor 81 detects an original T on which an image is printed. The positioning sensor 81 consists for example of a reflection type photosensor. The positioning sensor 81 pulls up an output signal when an original T is detected, and pulls down the output signal when the original T becomes no longer detected. The output signal is transmitted to the control section 41. Namely, while the original T is passing through the positioning sensor 81, the output signal is maintained at a certain level.

The image reading section 12 reads a color image formed on an original T, i.e., a color image printed on the original T. The image reading section 12 is provided with a one-dimensional image sensor 128. In addition to the image sensor 128, the image reading section 12 is further provided with a first platen glass 121, a second platen glass 122, a light source 123, mirrors 124, 125 and 126, an image forming optical section 127 and an optical drive section which is not shown in the figure.

The light source 123 irradiates an original T with light. The optical drive section not shown in the figure moves the original T or the image sensor 128 in relation to each other in the sub scanning direction. The sub scanning direction in this case is the direction which is perpendicular to the main scanning direction in which are arranged a plurality of light receiving devices forming the image sensor 128.

An original T is conveyed by the automatic document feeder 14 and passed through an optical system of the image reading section 12 to read an image(s) on either or both sides of the original T. The incident light of the image reading operation is read by the image sensor 128. In a platen mode, the image sensor 128 outputs an image reading signal Sout which is obtained by reading an original T based on the RGB color model. This platen mode is a mode in which the optical drive section not shown in the figure is driven to automatically read an image printed on an original T which is placed on a platen glass such as a first platen glass 121 and a second platen glass 122.

The image sensor 128 includes three line color CCD imaging devices. Namely, the image sensor 128 consists of a plurality of light receiving element rows arranged in the main scanning direction. Specifically, read sensors which detect light corresponding to red (R), a green (G) and blue (B) divide picture elements in different positions in the sub scanning direction perpendicular to the main scanning direction to read optical information corresponding to red, green and blue at the same time respectively. For example, when an original T is reversed by the roller 143 as a U-shaped turn in the automatic feeding mode, the image sensor 128 reads the surface of the original T and outputs an image reading signal Sout.

More specifically, the image sensor 128 is connected to the image processing section 43 through the control section 41, and photoelectrically converts an incident light. The image reading signal Sout which is an analog signal photoelectrically converted by the image sensor 128 is processed by performing an analog process, A/D conversion, shading compensation, an image compression process, a variable magnification process and so forth in the image processing section 43. As a result, the image reading signal Sout becomes digital image data consisting of a color R component, a color G component and a color B component. The image processing section 43 converts this digital image data, i.e., RGB code, into image signals Dy, Dm, Dc and Dk corresponding to color Y (yellow), color M (Magenta), color C (cyan) and color K (black) respectively. The image processing section 43 transfers the converted data to LED writing units 611Y, 611M, 611C and 611K incorporated in the image forming section 60.

The image forming apparatus 60 makes use of an electrophotographic process technique. The image forming section 60 forms intermediate transfer type color images. This image forming section 60 is, for example, based on a vertical tandem system.

Specifically, the image forming section 60 forms respective images based on the image data transferred from the image processing section 43, i.e., signals Dy, Dm, Dc and Dk. The image forming section 60 is provided with image forming units 601Y, 601M, 601C and 601K corresponding to the color components respectively, the intermediate transfer section 620, and a fixing section 630 for fixing toner images.

The image forming unit 601Y forms an image of color Y (yellow). The image forming unit 601Y is provided with a photoreceptor drum 613Y, a charging section 614Y, an LED writing unit 611Y, a developing section 612Y, and a cleaning section 616Y.

The photoreceptor drum 613Y forms a toner image of color Y thereon. The charging section 614Y is arranged in the vicinity of the photoreceptor drum 613Y, and uniformly charges the surface of the photoreceptor drum 613Y with negative charge by corona discharge. The LED writing unit 611Y irradiates the photoreceptor drum 613Y with light corresponding to an image of color Y component. The developing section 612Y forms a toner image by attaching a toner of color Y component to the surface of the photoreceptor drum 613Y to visualize the electrostatic latent image. The cleaning section 616Y removes transfer residual toner which remains on the surface of the photoreceptor drum 613Y after a first transfer process.

Incidentally, each of the image forming units 601M, 601C and 601K has the similar constituent elements and functions as the image forming unit 601Y except for the color of images to be formed, and therefore redundant description is not repeated.

Meanwhile, the image forming units 601Y, 601M, 601C and 601K are collectively referred to simply as the image forming unit 601. Also, the LED writing units 611Y, 611M, 611C and 611K are collectively referred to simply as the LED writing unit 611. Furthermore, the developing sections 612Y, 612M, 612C and 612K are collectively referred to simply as the developing section 612. Still further, the photoreceptor drums 613Y, 613M, 613C and 613K are collectively referred to simply as the photoreceptor drum 613. Still further, the charging sections 614Y, 614M, 614C and 614K are collectively referred to simply as the charging section 614. Still further, the cleaning sections 616Y, 616M, 616C and 616K are collectively referred to simply as the cleaning section 616.

The intermediate transfer section 620 is provided with an intermediate transfer belt 621, transfer rollers 622Y, 622M, 622C and 622K, a transfer roller 623, a belt cleaning apparatus 624 and the like.

The intermediate transfer belt 621 is an endless belt which is wound around the plurality of support rollers in the form of a loop. At least one of the plurality of support rollers consists of a drive roller, and the others consist of non-driven rollers respectively. For example, preferably, the support roller located in the downstream side of the first transfer rollers 622K for K component in the belt running direction is preferably implemented as the drive roller in this case. When the drive roller rotates, the intermediate transfer belt 621 runs at a constant speed in the direction indicated with arrow Z.

The first transfer rollers 622Y, 622M, 622C and 622K are arranged in the inner surface side of the intermediate transfer belt 621 and opposed to the photoreceptor drums 613 in correspondence with the color components respectively. The first transfer rollers 622Y, 622M, 622C and 622K are urged against the photoreceptor drums 613Y, 613M, 613C and 613K respectively through the intermediate transfer belt 621. First transfer nip portions are thereby formed for transferring toner images from the photoreceptor drums 613Y, 613M, 613C and 613K to the intermediate transfer belt 621.

Incidentally, the first transfer rollers 622Y, 622M, 622C and 622K are collectively referred to simply as the first transfer roller 622 when they need not be distinguished.

The second transfer roller 623 is located in the outer surface side of the intermediate transfer belt 621 and opposed to one of the plurality of support rollers. The support roller located opposite to the intermediate transfer belt 621 is called a backup roller. A second transfer nip portion is formed by urging the second transfer roller 623 against the backup roller with the intermediate transfer belt 621 therebetween for transferring the toner images from the intermediate transfer belt 621 to a sheet P.

When the intermediate transfer belt 621 is passed through the first transfer nip portions, toner images are successively transferred to the intermediate transfer belt 621 from the photoreceptor drum 613 and superimposed on the intermediate transfer belt 621 respectively as a first transfer process. More specifically, a first transfer bias voltage is applied to the first transfer roller 622 in order to charge the rear surface (which contacts the first transfer roller 622) of the intermediate transfer belt 621 with electricity of the polarity opposite to that of toner so that the toner images are electrostatically transferred to the intermediate transfer belt 621.

The superimposed toner image on the intermediate transfer belt 621 is then transferred to a sheet P which is passed through the second transfer nip portion as a second transfer process. More specifically, a second transfer bias voltage is applied to the second transfer roller 623 in order to charge the back side of the sheet P, i.e. the side which contacts the second transfer roller 623, with electricity of the polarity opposite to that of toner so that the superimposed toner image is electrostatically transferred to the sheet P. The sheet P with the transferred toner image is conveyed to the fixing section 630.

The belt cleaning section 624 includes a belt cleaning blade, which is in slidable contact with the surface of the intermediate transfer belt 621, and so forth. The belt cleaning section 624 removes toner which remains on the surface of the intermediate transfer belt 621 after the second transfer process.

The fixing section 630 is provided with a heat roller 631, a pressure roller 632, a heating section 633 and a temperature detection section 83 to fix a toner image transferred by the image forming section 60 to a sheet P.

Specifically, the heating section 633 is located in the heat roller 631 to intermittently heat the heat roller 631. The pressure roller 632 is located opposite to the heat roller 631 to apply a pressure to the heat roller 631. The temperature detection section 83 is located around the heat roller 631 to detect the temperature of the heat roller 631. The sampling frequency of the temperature detection section 83 is for example 100 ms.

The fixing section 630 heats the heat roller 631 with the heating section 633 in accordance with the detection result of the temperature detection section 83 which detects the temperature of the heat roller 631. The fixing section 630 forms a fixing nip between the heat roller 631 and the pressure roller 632 which are urged against each other.

The fixing section 630 fixes the transferred image to a sheet P under the pressure applied by the pressure roller 632 and the heat applied through the heat roller 631. An image is then printed on the sheet P by the fixing process of the fixing section 630. After printing the image, the sheet P is discharged outwards by discharging rollers 304, and for example conveyed to the image reading apparatus 7.

Alternatively, the sheet P with the image printed thereon may not be conveyed to the image reading apparatus 7, but stacked on the catch tray 305.

The paper feed section 20 is provided with paper feed cassettes 200, feed rollers 201 and the like. The paper feed cassette 200 accommodates sheets P. The feed rollers 201 take in the sheets P accommodated in the paper feed cassettes 200 and feed out the sheets P to the conveyance section 30.

The conveyance section 30 includes a conveying route 300 along which sheets P are conveyed. The conveying route 300 is provided with paper feed rollers 302A, conveyance rollers 302B, 302C and 302D, a paper stop roller 303 and so forth.

The conveying route 300 conveys a sheet P fed from the paper feed section 20 to the image forming section 60. Meanwhile, in the case where an image is to be formed also on the back side of a sheet P, the sheet P is conveyed through a paper circulation route 307A, a sheet reversing route 307B and a refeeding conveying route 307C in this order by a branch section 306 after forming an image on the front side of the sheet P.

The image forming apparatus 5 performs various types of processing through the control section 41. For example, the image reading signal Sout which is output from the image reading section 12 is transmitted to the image processing section 43 or an image memory (not shown in the figure) through the control section 41. The image memory consists, for example, of a hard disk.

Specifically, the control section 41 consists mainly of a CPU, a ROM, a RAM, and an I/O interface. The CPU of the control section 41 reads various programs from the ROM or a storage section which is not shown in the figure in accordance with required processes, loads the programs on the RAM, and executes the loaded programs to cooperate with the control section 41 and control the operation of each element of the image forming apparatus 5.

In other words, the control section 41 is responsible for controlling the operation of the image forming apparatus 5 and implemented with a microcomputer which consists mainly of the CPU, the ROM, the RAM, and the I/O interface which are not shown in the figure. A predetermined control program is run by the control section 41 to implement various functions.

Figure 3:
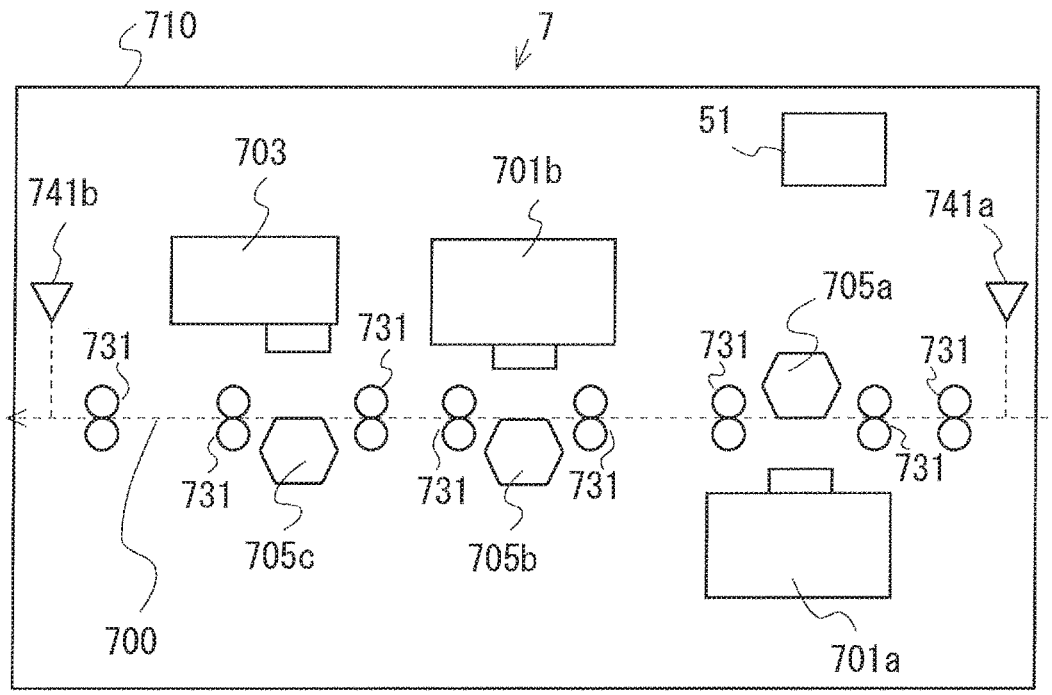
FIG. 3 is a view for showing an example of the configuration of an image reading apparatus 7 in accordance with the embodiment of the present invention.

FIG. 3 is a view for showing an example of the configuration of the image reading apparatus 7 in accordance with the embodiment of the present invention. The image reading apparatus 7 is arranged in the downstream side of the image forming apparatus 5 and responsible for reading an image printed on one or both side of a sheet P. The image reading apparatus 7 obtains correction amounts of an image printed on the sheet P based on the reading results such as the color, position and magnification factor of the image, and feeds back the correction amounts of the image to the image forming apparatus 5.

The image reading apparatus 7 is provided with a control section 51, a first scanner 701a, a second scanner 701b, a spectrophotometer 703, a first calibration member 705a, a second calibration member 705b, a third calibration member 705c, a conveyance roller 731, and a conveying route 700. The conveying route 700 is a route through which is passed a sheet P supplied from the image forming apparatus 5, and serves to convey the sheet P by driving the conveyance roller 731.

The image reading apparatus 7 receives a sheet P supplied from the image forming apparatus 5. After receiving the sheet P, the image reading apparatus 7 has the first scanner 701a, the second scanner 701b or the spectrophotometer 703 detect the image formed on the sheet P. The result of detecting the image is output to the control section 51 of the image reading apparatus 7.

The control section 51 is responsible for controlling the image reading apparatus 7 and can be implemented with a microcomputer consisting mainly of a CPU, a ROM, a RAM, and an I/O interface. A predetermined control program is run by the control section 51 to implement various functions.

Incidentally, the control section 51 performs various processes based on the result of detecting the image, and transmits the results of the processes to the control section 41 of the image forming apparatus 5.

The first scanner 701a and the second scanner 701b are arranged to face a sheet P which is passed through the conveying route 700 and read an image printed on the sheet P. The first scanner 701a reads the back side of a sheet P. The reading result of the first scanner 701a is used, for example, to check misalignment between images printed on the front and back sides of the sheet P, the existence of an extraordinary image or the like. On the other hand, the second scanner 701b reads the front side of a sheet P. Namely, the second scanner 701b reads an image printed on the sheet P such as patches which is not shown in the figure.

Incidentally, the first scanner 701a and the second scanner 701b are collectively referred to simply as the scanner 701 when they need not be distinguished.

Incidentally, the image reading apparatus 7 is configured to operate as either an in-line system or an offline system.

The in-line system provides a configuration in which the image reading apparatus 7 is directly fed with a sheet P which is supplied from the image forming apparatus 5. On the other hand, the offline system is not configured that the image reading apparatus 7 is directly fed with a sheet P which is supplied from the image forming apparatus 5. The offline system provides a configuration in which the image forming apparatus 5 and the image reading apparatus 7 are designed independently from each other. The following explanation of the present embodiment is based on the assumption that an in-line system is used. However, an offline system can be used instead.

The spectrophotometer 703 is arranged to face a sheet P passing along the conveying route 700 in the downstream side of the scanner 701. For example, the spectrophotometer 703 guarantees the absolute value of the color of an image formed on a sheet P by colorimetrically measuring patches of images printed on the sheet P.

Specifically, the spectrophotometer 703 radiates visible light to the patches from a visible light source which is not shown in the figure. The visible light is reflected by the third calibration member 705c as reflected light. The spectrophotometer 703 acquires an optical spectrum of the light reflected by the third calibration member 705c. The spectrophotometer 703 derives the color tones of the patches by performing operations in a predetermined color model based on the acquired optical spectrum.

The colorimetric result of the patches is generated as numeric data, i.e., colorimetric values, represented in a predetermined color model such as Lab color space or XYZ color space, and output to the control section 51 or the control section 41.

Incidentally, the colorimetric range, i.e., the viewing angle of the spectrophotometer 703 is narrower than the reading area of the scanner 701. The viewing angle of the spectrophotometer 703 is set to be narrower than the width of the patches in the sheet width direction. Specifically, a lens section which receives the light reflected from the patches has, for example, a diameter of about 4 mm.

Since colorimetric measurement is performed within a limited range of viewing angle in this manner, the spectrophotometer 703 can generate the color information with higher accuracy than the scanner 701.

Incidentally, the control section 51 corrects the color information of patches read by the scanner 701 based on the colorimetric values of the patches colorimetrically measured by the spectrophotometer 703. More specifically, the control section 51 associates the color information of the patches colorimetrically measured by the spectrophotometer 703 with the color information of the patches read by the scanner 701. Since the color information of the patches colorimetrically measured by the spectrophotometer 703 and the color information of the patches read by the scanner 701 are associated with each other, the colorimetrically measurement result of the spectrophotometer 703 can be reflected in the reading result of the scanner 701 to obtain an accurate correction amount.

The image processing section 43 optimizes images to be formed by the image forming section 60 based on the correction amount calculated by the control section 51. The process of optimizing images to be performed by the image processing section 43 includes positional adjustment of images to be printed on the front and back sides of a sheet P, adjustment of densities, adjustment of color tones and so forth.

Namely, the image processing section 43 corrects the color, position or magnification factor of an image formed on a sheet P in accordance with the reading result of the sheet P of the image reading apparatus 7. Specifically, the image processing section 43 corrects the image formed on the sheet P based on the corrected color information. The image processing section 43 outputs a command to the image forming section 60 based on the correction result for forming an image on the sheet P.

The first calibration member 705a is arranged to face the first scanner 701a. The second calibration member 705b is arranged to face the second scanner 701b. Namely, the first calibration member 705a and the second calibration member 705b are structured to reflect irradiation light to be radiated to a sheet P when reading an image.

Incidentally, the first calibration member 705a, the second calibration member 705b and the third calibration member 705c are collectively referred to simply as the calibration member 705 when they need not be distinguished.

The image reading apparatus 7 is provided with detection sections 741a and 741b. The detection section 741a is located at the entrance side of the conveying route 700 to detect the existence of a sheet P. The detection section 741b is located at the exit side of the conveying route 700 to detect the existence of a sheet P. Incidentally, the detection sections 741a and 741b are collectively referred to simply as the detection section 741.

Next, a conveyance unit 750 will be explained as a structure which allows the calibration member 705 to be taken out from the image reading apparatus 7. The conveyance unit 750 is normally in a state installed in a housing 710 of the image reading apparatus 7.

Figure 4:
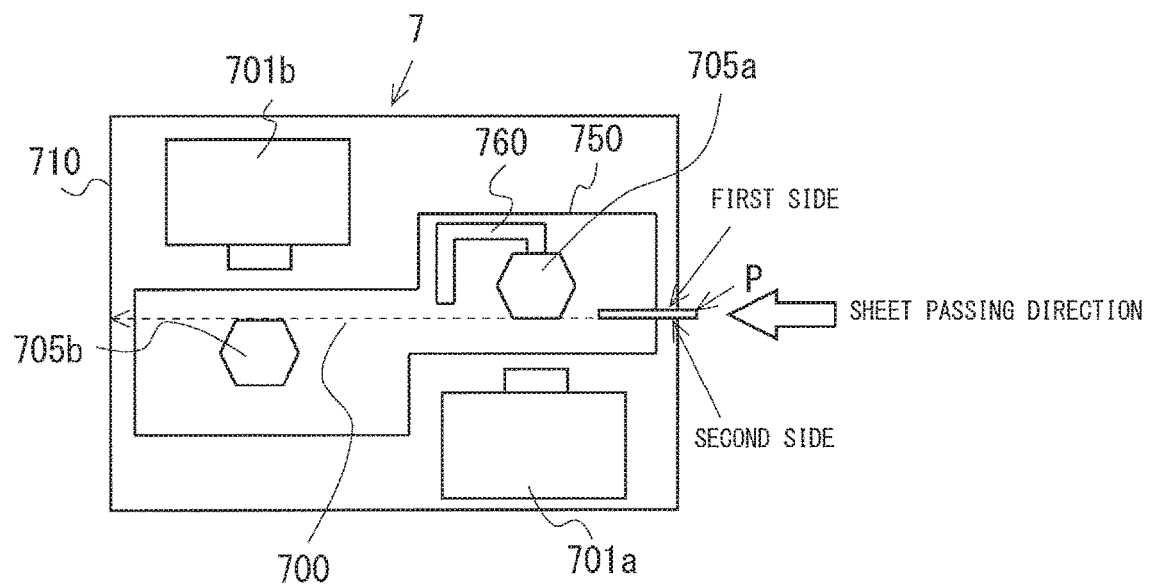
FIG. 4 is a view schematically showing an exemplary structure of a conveyance unit 750 in accordance with the embodiment of the present invention.

FIG. 4 is a view schematically showing an exemplary structure of the conveyance unit 750 in accordance with the embodiment of the present invention. The constituent elements of the image reading apparatus 7 are installed within the housing 710. The conveyance unit 750 is attached to the housing 710 in order that it can be withdrawn from the housing 710. Incidentally, the conveyance unit 750 may not only directly be attached to the housing 710 but also indirectly be installed in the housing 710.

As shown in FIG. 4, the image reading apparatus 7 conveys a sheet P along the conveying route 700 which is formed inside the housing 710. When passing through the conveying route 700, the sheet P has a first side facing upward and a second side facing downward. The image reading apparatus 7 reads an image formed on the sheet P with a plurality of the scanners 701. Meanwhile, illustration of some elements shown in FIG. 3 such as the spectrophotometer 703 is omitted in FIG. 4.

Of the plurality of scanners 701 installed in the housing 710, as shown in FIG. 4, the first scanner 701a is located below the conveying route 700 to read an image formed on the second surface of a sheet P. The first calibration member 705a is attached to the conveyance unit 750 and located above the first scanner 701a to reflect light radiated from the first scanner 701a. Incidentally, the first scanner 701a may not only directly be attached to the housing 710 but also indirectly be installed in the housing 710.

Of the plurality of scanners 701 installed in the housing 710, the second scanner 701b is located above the conveying route 700 to read an image formed on the first surface of a sheet P. The second calibration member 705b is located below the second scanner 701b to reflect light radiated from the second scanner 701b.

Meanwhile, while the first scanner 701a and the second scanner 701b are located above and below the conveying route 700 respectively in the above example of the present embodiment, the present invention is not limited thereto. Namely, the first scanner 701a and the first calibration member 705a can be located in either one of the upstream side and the downstream side of the conveying route 700, and the second scanner 701b and the second calibration member 705b can be located in the other of the upstream side and the downstream side of the conveying route 700.

As shown in FIG. 4, the conveyance unit 750 is provided with a separation unit 760. The separation unit 760 separates the first calibration member 705a upward from the first scanner 701a. When the separation unit 760 separates the first calibration member 705a, the conveyance unit 750 is disconnected from the housing 710.

Figure 5:
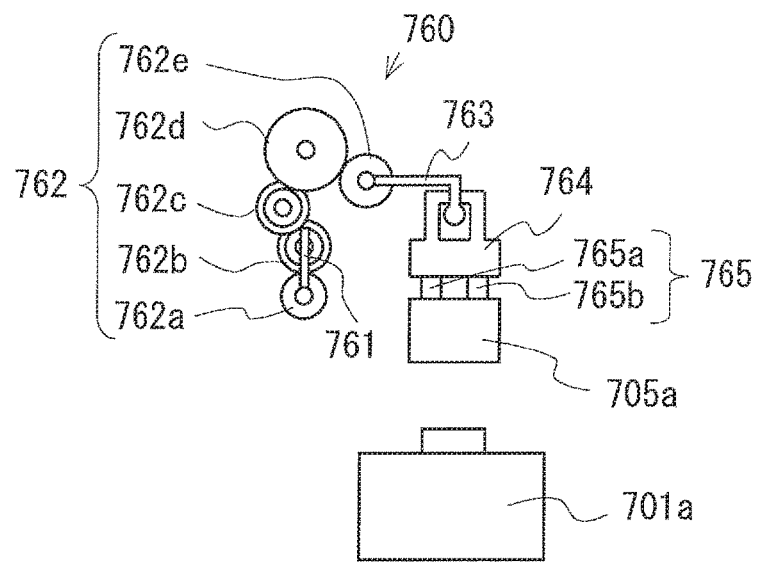
FIG. 5 is a view schematically showing an exemplary structure of a separation unit 760 holding a first calibration member 705a below in accordance with the embodiment of the present invention.
Figure 6:
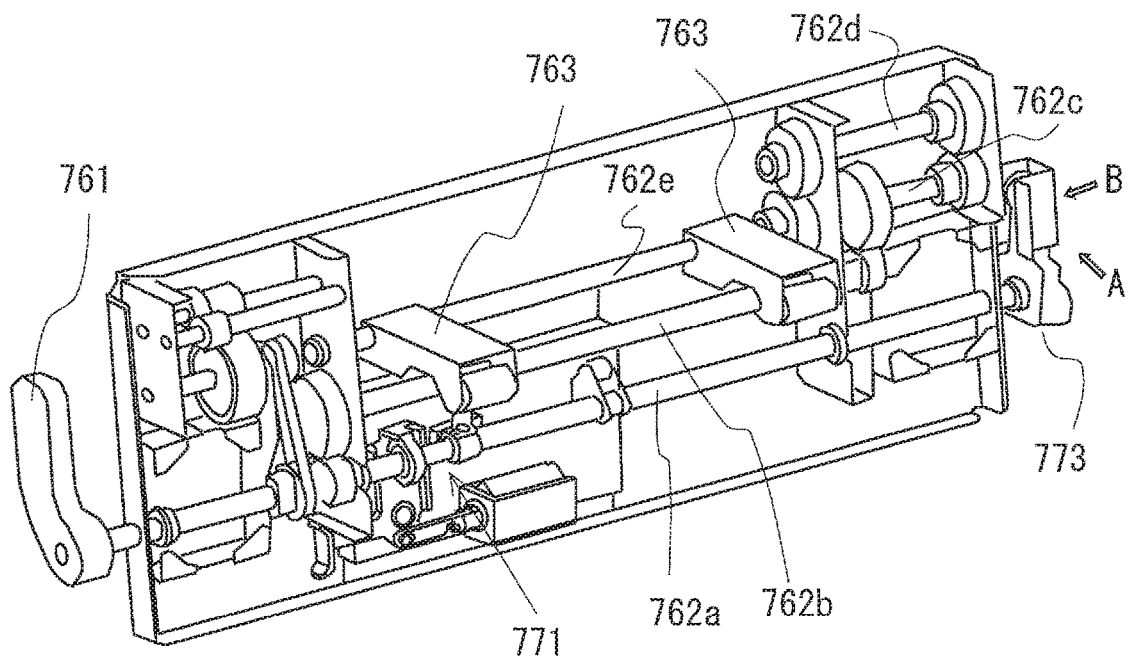
FIG. 6 is a perspective view for showing the separation unit 760 holding the first calibration member 705a below in accordance with the embodiment of the present invention.

Next, the separation unit 760 will specifically be explained. FIG. 5 is a view schematically showing an exemplary structure of the separation unit 760 holding the first calibration member 705*a* below in accordance with the embodiment of the present invention. FIG. 6 is a perspective view for showing the separation unit 760 holding the first calibration member 705*a* below in accordance with the embodiment of the present invention. As shown in FIGS. 5 and 6, the separation unit 760 is provided with an operation member 761, a transmission section 762 and support members 763.

The operation member 761 consists of a lever which is operated by a user of the image reading apparatus 7 when the conveyance unit 750 is taken out. The transmission section 762 holds the operation member 761 in order to transmit the operation of the operation member 761. Specifically, the transmission section 762 consists of transmission members 762*a* to 762*e*. Each of the transmission members 762*a* to 762*e* consists of a shaft and a gear mechanism such that the rotation of one shaft can be transmitted to another shaft. For example, the shaft of the transmission member 762*a* is connected to the operation member 761 such that the operation of the operation member 761 can be transmitted to the transmission section 762.

The support members 763 support the first calibration member 705*a* which is moved upward or downward in response to the operation of the operation member 761 transmitted through the transmission section 762.

As shown in FIG. 6, the separation unit 760 is provided with an operation lock section 771. In accordance with the detection result of the detection section 741 shown in FIG. 3, the operation lock section 771 sets the operation member 761 in either one of a state in which the operation member 761 can be operated and a state in which the operation member 761 cannot be operated.

When a sheet is jammed in the conveying route 700 and a jam handling procedure is performed, it is desired to lift the first calibration member 705*a* in advance of withdrawing the conveyance unit 750. For example, while a lid of the image reading apparatus 7 is opening, the detection section 741 shown in FIG. 3 detects whether or not there is a sheet P at the entrance side and the exit side of the conveying route 700 respectively. The operation lock section 771 makes it possible to operate the operation member 761 only when the detection section 741 detects that there is no sheet P at either the entrance side or the exit side of the conveying route 700 respectively.

Figure 7:
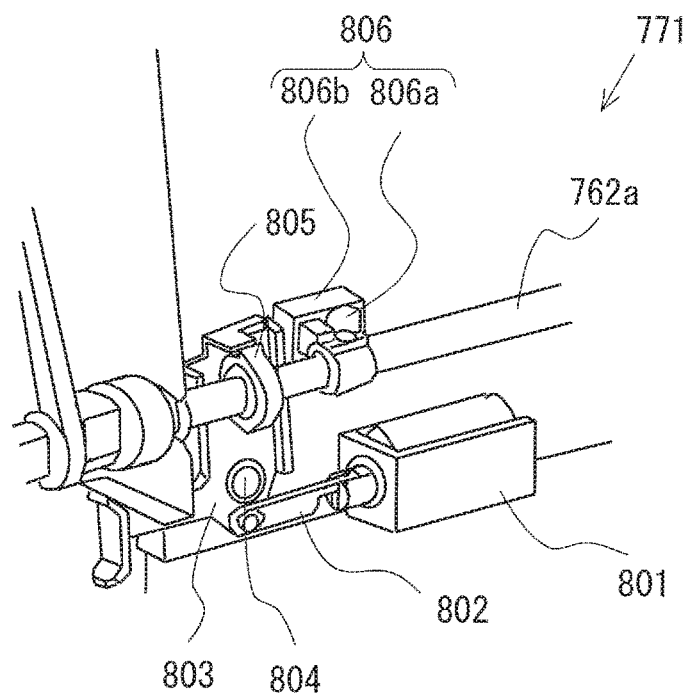
FIG. 7 is a schematic diagram for showing an example of a locking state of an operation lock section 771 which is provided on a transmission section 762 in accordance with the embodiment of the present invention.
Figure 8:
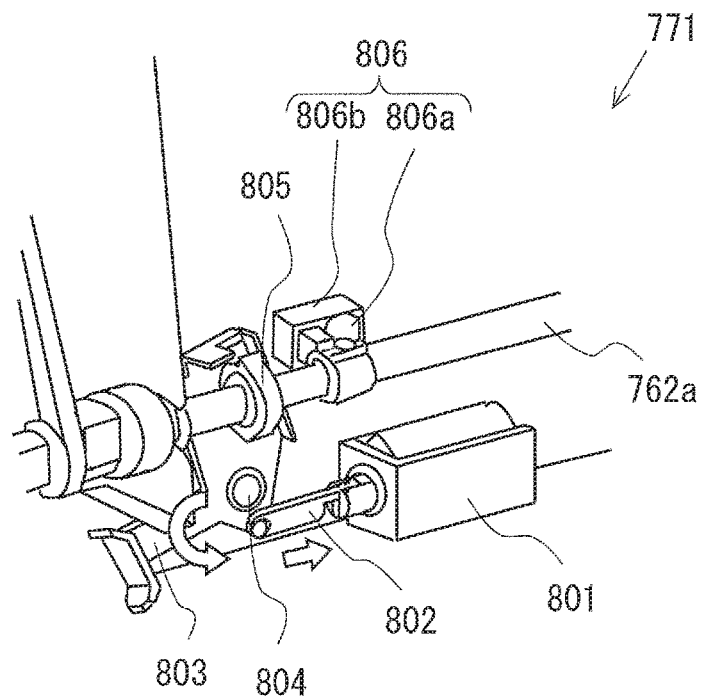
FIG. 8 is a schematic diagram for showing an example of an unlocking state of the operation lock section 771 which is provided on the transmission section 762 in accordance with the embodiment of the present invention.

FIG. 7 is a schematic diagram for showing an example of a locking state of the operation lock section 771 which is provided on the transmission section 762 in accordance with the embodiment of the present invention. FIG. 8 is a schematic diagram for showing an example of an unlocking state of the operation lock section 771 which is provided on the transmission section 762 in accordance with the embodiment of the present invention. As shown in FIGS. 7 and 8, the operation lock section 771 is provided with a drive section 801, a metal plate 802, a lock member 803, an axle member 804, a stopper member 805, an axial rotation detecting section 806 and so forth.

As shown in FIG. 8, the drive section 801 pulls the metal plate 802 when the detection section 741 becomes no longer detecting a sheet P with reference to the detection result of the detection section 741. When the metal plate 802 is pulled, the lock member 803 rotates in the counter clockwise direction to release the stopper member 805 from the locking state. The operation of the operation member 761 thereby becomes possible. If the operation member 761 is operated in this case, the operation of the operation member 761 is transmitted to the transmission member 762*a*.

Incidentally, the axial rotation detecting section 806 is provided with a rotary member 806*a* and a rotation detecting section 806*b*. The rotary member 806*a* is fixed to the shaft of the transmission member 762*a*, and made, for example, of a fan-shaped plate. The rotary member 806*a* rotates simultaneously with the shaft of the transmission member 762*a*, and is detected by the rotation detecting section 806*b*. The rotation detecting section 806*b* consists for example of a light emitting device and a light receiving device to detect the rotary member 806*a* passing therebetween.

Figure 9:
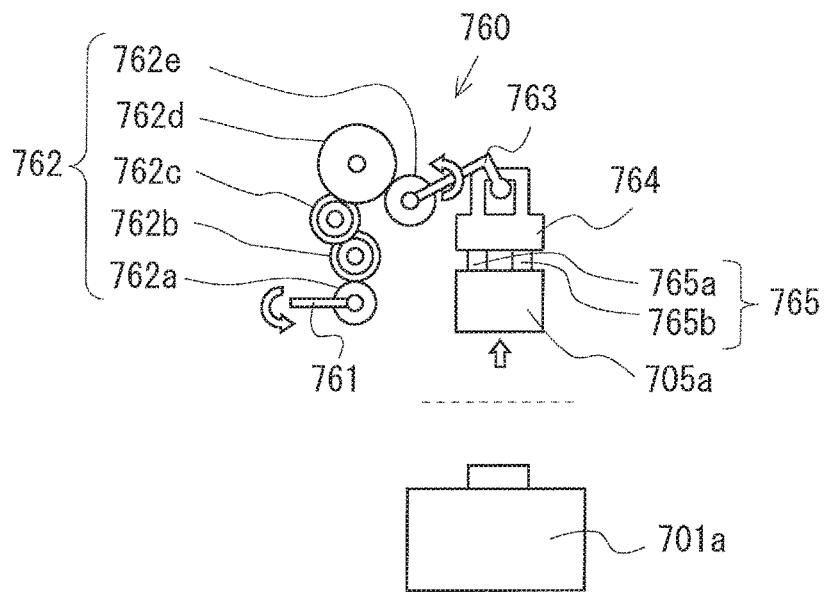
FIG. 9 is a view schematically showing an exemplary structure of the separation unit 760 which is lifting the first calibration member 705a upward in accordance with the embodiment of the present invention.
Figure 10:
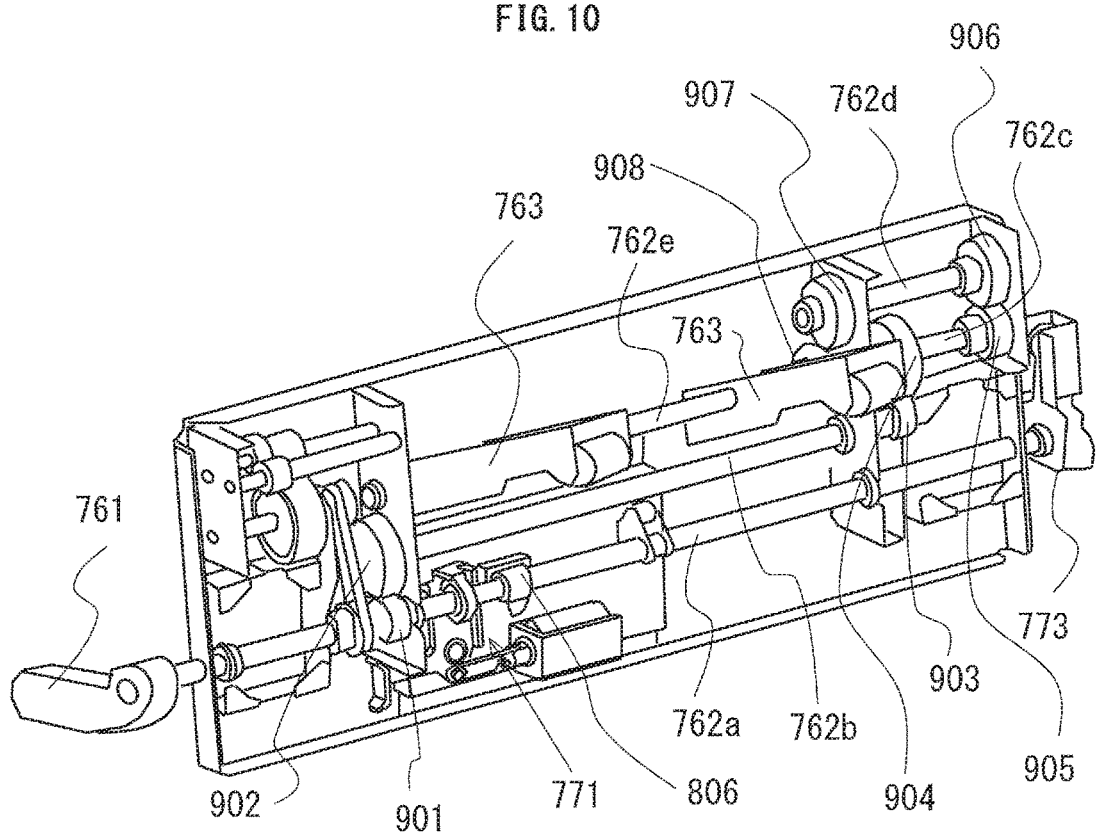
FIG. 10 is a perspective view for showing the separation unit 760 which is lifting the first calibration member 705a upward in accordance with the embodiment of the present invention.

FIG. 9 is a view schematically showing an exemplary structure of the separation unit 760 which is lifting the first calibration member 705*a* upward in accordance with the embodiment of the present invention. FIG. 10 is a perspective view for showing an exemplary structure of the separation unit 760 which is lifting the first calibration member 705*a* upward in accordance with the embodiment of the present invention.

As shown in FIG. 9, when the operation member 761 is rotated in the counter clockwise direction, the rotation of the operation member 761 is transmitted to the transmission members 762*a* to 762*e*, and the support members 763 are rotated in the counter clockwise direction to lift the first calibration member 705*a* through an intervening member 764 to be described below in detail. Specifically, when the operation member 761 is rotated in the counter clockwise direction as shown in FIG. 10, the shaft of the transmission member 762*a* is rotated. Then, a gear 901 fixed to the shaft of the transmission member 762*a* is also rotated in the counter clockwise direction. The rotation of the gear 901 is transmitted to a gear 902 which is fixed to one end of the shaft of the transmission member 762*b*. The gear 902 is thereby rotated in the clockwise direction. When the gear 902 is rotated in the clockwise direction, a gear 903 which is fixed to the other end of the shaft of the transmission member 762*b* is also rotated in the clockwise direction.

The rotation of the gear 903 is transmitted to a gear 904 which is fixed to one end of the shaft of the transmission member 762*c*. The gear 904 is thereby rotated in the counter clockwise direction. The rotation of the gear 904 is transmitted to the gear 905 which is fixed to the other end of the shaft of the transmission member 762*c*. The gear 905 is thereby rotated in the counter clockwise direction. The rotation of the gear 905 is transmitted to a gear 906 which is fixed to one end of the shaft of the transmission member 762*d*.

The gear 906 is thereby rotated in the clockwise direction. The rotation of the gear 906 is transmitted to the gear 907 which is fixed to the other end of the shaft of the transmission member 762*d*. The gear 907 is thereby rotated in the clockwise direction.

The rotation of the gear 907 is transmitted to a gear 908 which is fixed to the shaft of the transmission member 762*e*. The gear 908 is thereby rotated in the counter clockwise direction. The rotation of the gear 908 is transmitted to the support members 763 which are fixed to the shaft of the transmission member 762*e*. The support members 763 are thereby rotated in the counter clockwise direction. As a result, the first calibration member 705*a* is lifted.

By this structure as explained above, the first calibration member 705*a* is lifted by the operation of the operation member 761. Next is an explanation of the structure in which connection between the conveyance unit 750 and the housing 710 is released when the first calibration member 705*a* is lifted.

Figure 11:
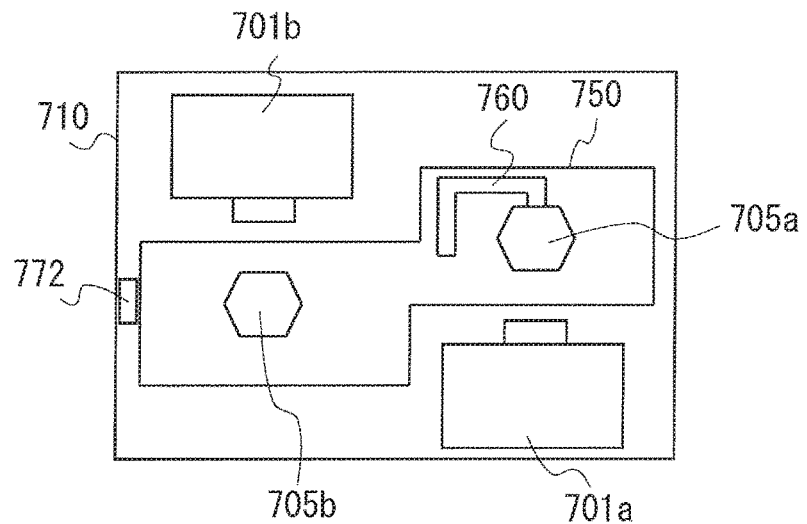
FIG. 11 is a schematic diagram for showing an example of a position in which a unit lock section 772 is arranged in accordance with the embodiment of the present invention.

FIG. 11 is a schematic diagram for showing an example of a position in which a unit lock section 772 is arranged in accordance with the embodiment of the present invention. As shown in FIG. 11, the unit lock section 772 is provided between the housing 710 and the conveyance unit 750. The unit lock section 772 changes connection between the conveyance unit 750 and the housing 710 to either a locked state or an unlocked state in response to the operation of the operation section 761.

Figure 12:
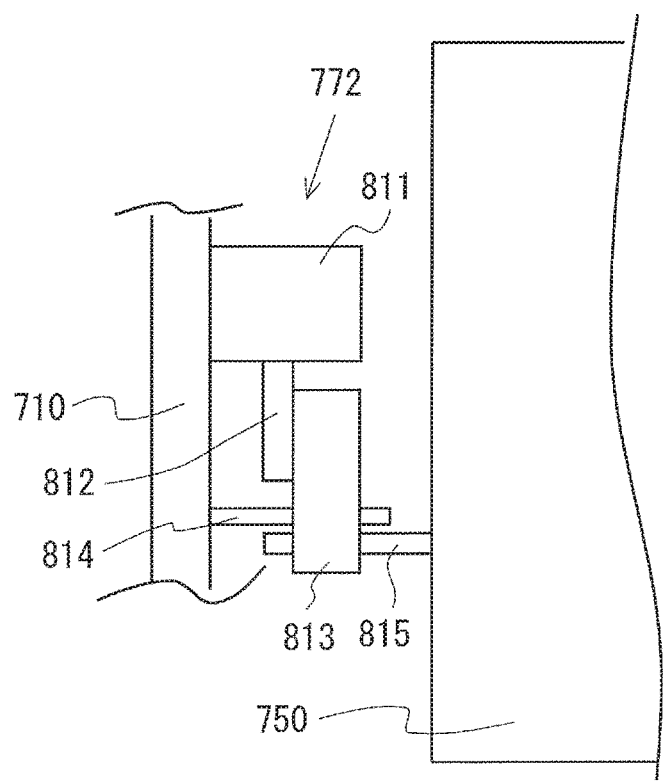
FIG. 12 is a view schematically showing an exemplary structure of the unit lock section 772 in accordance with the embodiment of the present invention.
Figure 13:
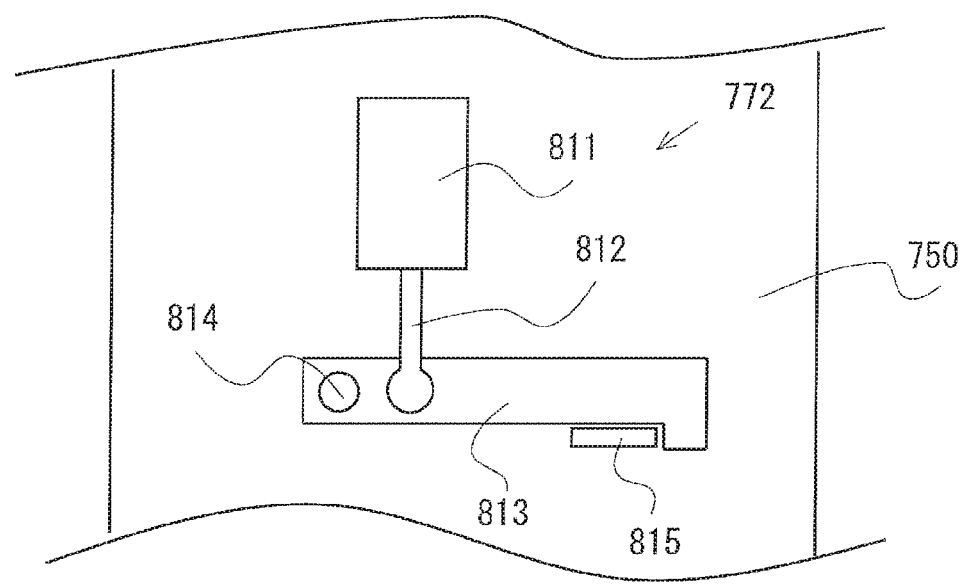
FIG. 13 shows one example of a locked state of the unit lock section 772 in accordance with the embodiment of the present invention.
Figure 14:
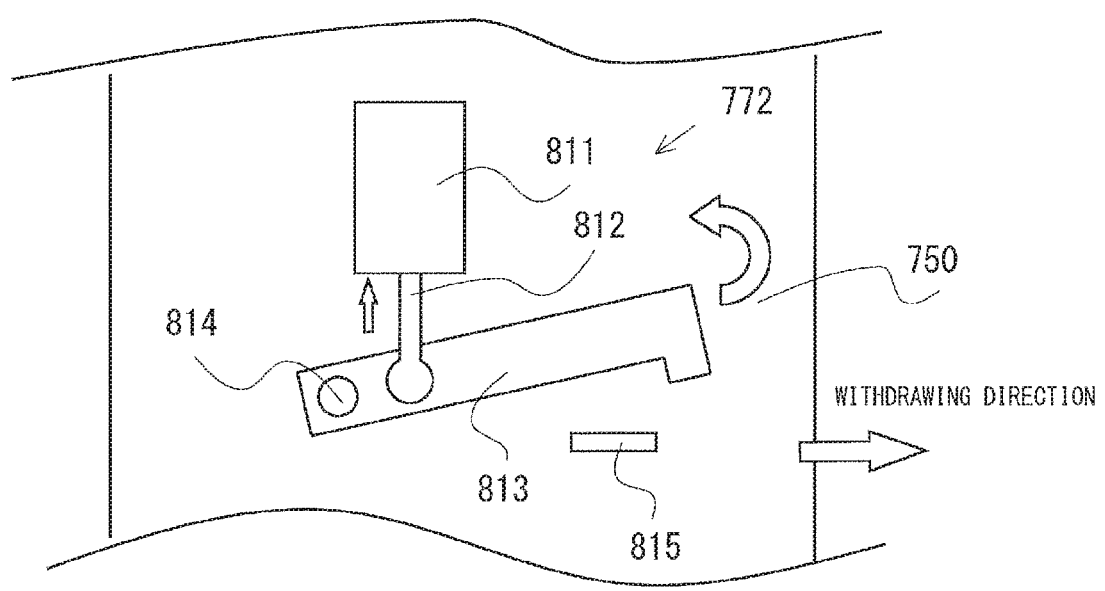
FIG. 14 shows one example of an unlocked state of the unit lock section 772 in accordance with the embodiment of the present invention.

FIG. 12 is a view schematically showing an exemplary structure of the unit lock section 772 in accordance with the embodiment of the present invention. FIG. 13 shows one example of the locked state of the unit lock section 772 in accordance with the embodiment of the present invention. FIG. 14 shows one example of the unlocked state of the unit lock section 772 in accordance with the embodiment of the present invention.

As shown in FIG. 12, the unit lock section 772 consists of a drive section 811, a metal plate 812, a lock member 813, an axle member 814, a stopper member 815 and the like. When the operation section 761 is rotated in the counter clockwise direction, the axial rotation detecting section 806 shown in FIG. 10 detects the rotation of the shaft of the transmission member 762a. The drive section 811 pulls the metal plate 812 upward, as illustrated in FIG. 14, when the axial rotation detecting section 806 shown in FIG. 10 detects the rotation.

By pulling the metal plate 812 upward, the lock member 813 is rotated in the counter clockwise direction around the axle member 814 fixed to the housing 710. When the lock member 813 is rotated in the counter clockwise direction, the lock member 813 releases the locked state between the lock member 813 and the stopper member 815 which is fixed to the conveyance unit 750. As a result, connection between the conveyance unit 750 and the housing 710 is released.

In other words, when the first calibration member 705a is moved upward by the operation of the operation section 761, the unit lock section 772 changes connection between the conveyance unit 750 and the housing 710 to the unlocked state.

By this structure as explained above, connection between the conveyance unit 750 and the housing 710 is released in response to the operation of lifting the first calibration member 705a. Next is an explanation of the structure in which the lifted state of the first calibration member 705a is maintained when the conveyance unit 750 is withdrawn from the housing 710.

Figure 15:
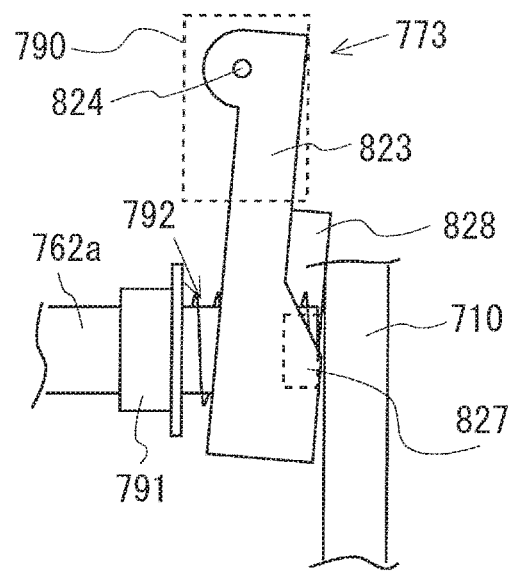
FIG. 15 shows one example of a locked state of a separation lock section 773 provided on the separation unit 760 in accordance with the embodiment of the present invention.
Figure 16:
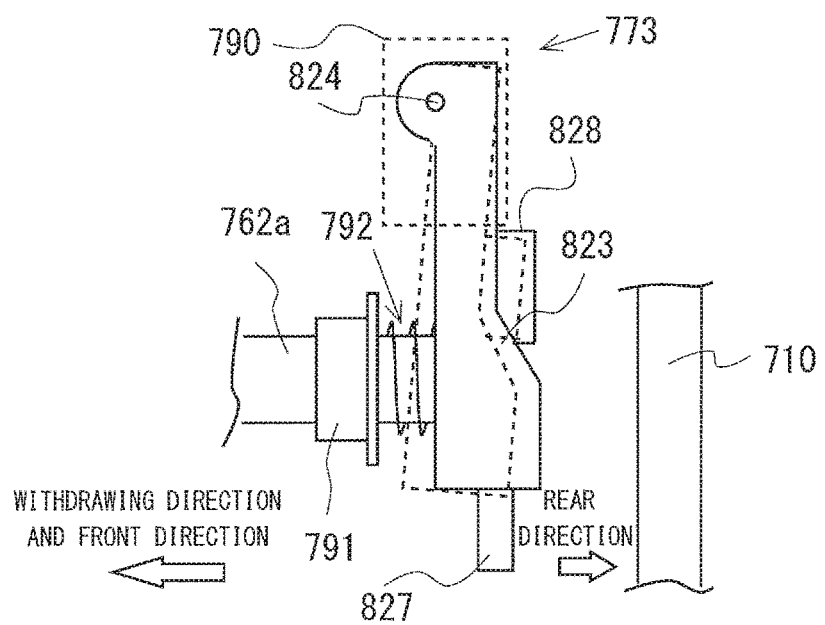
FIG. 16 shows one example of an unlocked state of the separation lock section 773 provided on the separation unit 760 in accordance with the embodiment of the present invention.
Figure 17:
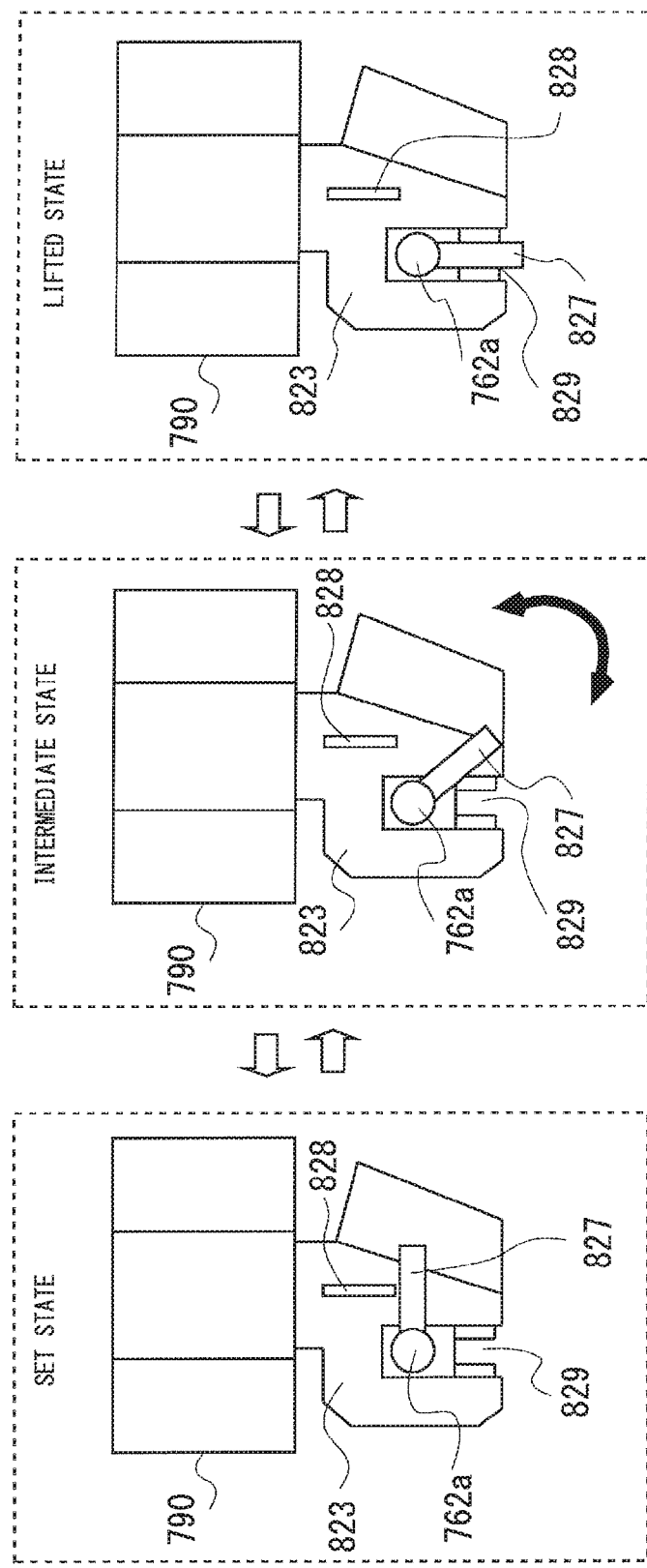
FIG. 17 is a schematic view for explaining state examples of the separation lock section 773 provided on the separation unit 760 in the order of movements of a pin in accordance with the embodiment of the present invention.
Figure 18:
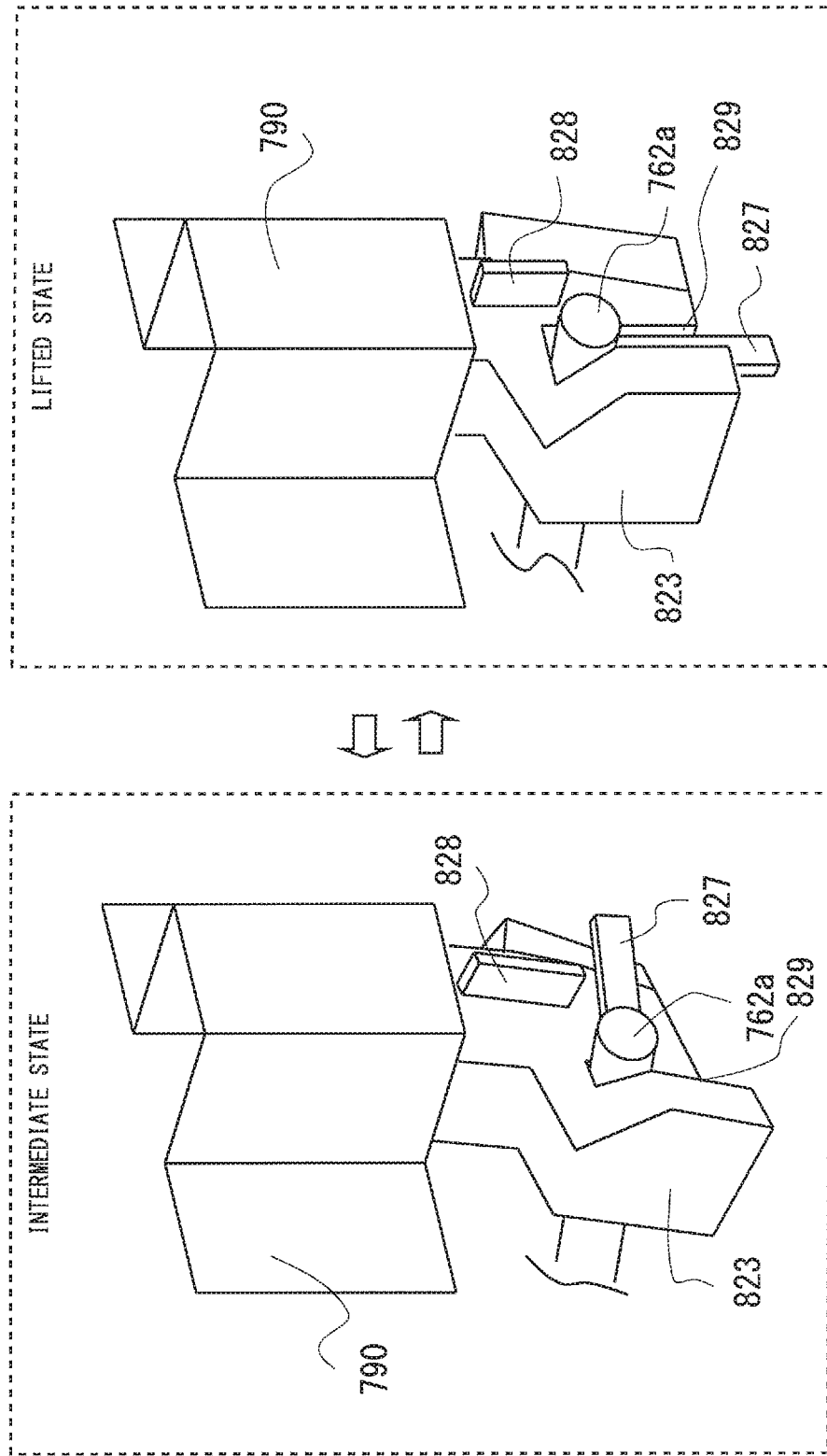
FIG. 18 is a perspective view for explaining state examples of the separation lock section 773 provided on the separation unit 760 in the order of movements of the lock in accordance with the embodiment of the present invention.

FIG. 15 shows one example of a locked state of a separation lock section 773 provided on the separation unit 760 in accordance with the embodiment of the present invention. FIG. 16 shows one example of an unlocked state of the separation lock section 773 provided on the separation unit 760 in accordance with the embodiment of the present invention. FIG. 17 is a schematic view for explaining state examples of the separation lock section 773 provided on the separation unit 760 in the order of movements of a pin in accordance with the embodiment of the present invention. FIG. 18 is a perspective view for explaining state examples of the separation lock section 773 provided on the separation unit 760 in the order of movements of the lock in accordance with the embodiment of the present invention.

FIGS. 15 and 16 are viewed as seen in direction A of FIG. 6. FIGS. 17 and 18 are viewed as seen in direction B of FIG. 6. As shown in FIGS. 15 and 16, the separation lock section 773 is provided with a holding member 790, a bearing member 791, a spring member 792, a lock member 823, an axle member 824, a pin member 827, a protruding member 828 and the like. In the case shown in FIG. 15, since the lock member 823 abuts on the housing 710, the spring member 792 has been compressed between the lock member 823 and the bearing member 791. FIG. 15 illustrates a set state shown in FIG. 17 and shows the state in which the conveyance unit 750 is connected to the housing 710. In the set state shown in FIG. 17, the pin member 827 fixed to the shaft of the transmission member 762a is positioned outside a groove 829 which is formed on the lock member 823. The locked state of the transmission member 762 with the lock member 823 has thereby been released, and therefore the shaft of the transmission member 762a can be rotated as shown in FIGS. 17 and 18.

Meanwhile, only for the purpose of showing the spring member 792, FIG. 15 illustrates the lock member 823 and the bearing member 791 with a space therebetween.

When the conveyance unit 750 is withdrawn, as shown in FIG. 16, the lock member 823 is moved away from the housing 710. The lock member 823 is rotated around the axle member 824 fixed to the holding member 790 to move in the rear direction, i.e., in the direction toward the housing 710 by the restoring force of the spring member 792. FIG. 16 illustrates the lifted state shown in FIG. 17 in which the first calibration member 705a is maintained in the lifted state. In the lifted state shown in FIG. 17, the pin member 827 fixed to the shaft of the transmission member 762a enters the groove 829 formed in the lock member 823. Specifically, as in the lifted state shown in FIG. 18, the pin member 827 is locked by the lock member 823 so that the shaft of the transmission member 762a cannot be rotated. When the shaft of the transmission member 762a cannot be rotated, the shafts of the transmission members 762b to 762e can also not be rotated. As a result, the transmission section 762 is locked to maintain the state of the first calibration member 705a being lifted.

Namely, when the first calibration member 705a is moved upward, the separation lock section 773 changes the transmission section 762 to the locked state. Incidentally, when the first calibration member 705a is returned to the set position, first, the conveyance unit 750 is inserted to the housing 710. The lock member 823 is then brought into the set state shown in FIG. 15 and FIG. 17 so that the pin member 827 moves out from the groove 829 of the lock member 823. The shaft of the transmission member 762a thereby becomes rotatable.

Second, the shaft of the transmission member 762a is rotated in the clockwise direction by rotating the operation section 761 in the clockwise direction. Next, as described above, the rotation is transmitted through the gears 901 to 908 in this order. As a result, the support members 763 is rotated in the clockwise direction to lower the first calibration member 705a.

By this structure as explained above, the lifted state of the first calibration member 705a is maintained when the conveyance unit 750 is withdrawn from the housing 710. Next is an explanation of the structure in which the first calibration member 705a is located in the reading position of the first scanner 701a.

Figure 19:
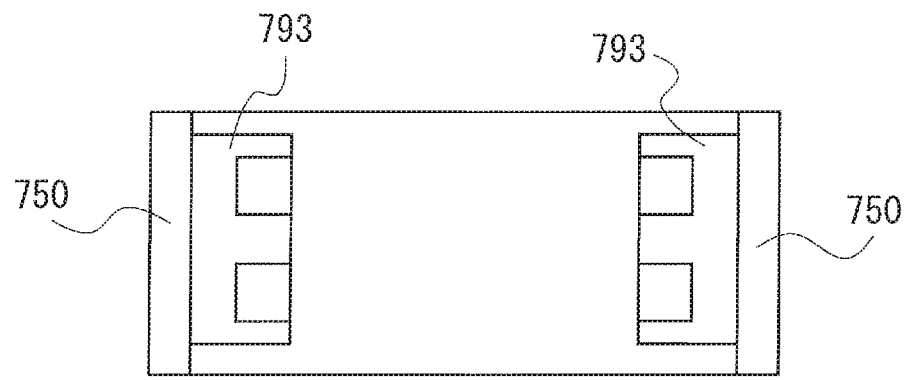
FIG. 19 is a plan view for showing positioning members 793 in accordance with the embodiment of the present invention.

FIG. 19 is a plan view for showing positioning members 793 in accordance with the embodiment of the present invention.

Figure 20:
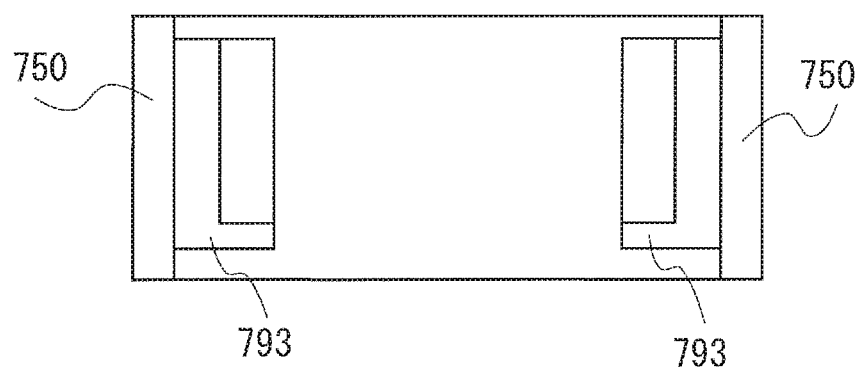
FIG. 20 is a side sectional view for showing the positioning members 793 in accordance with the embodiment of the present invention.
Figure 21:
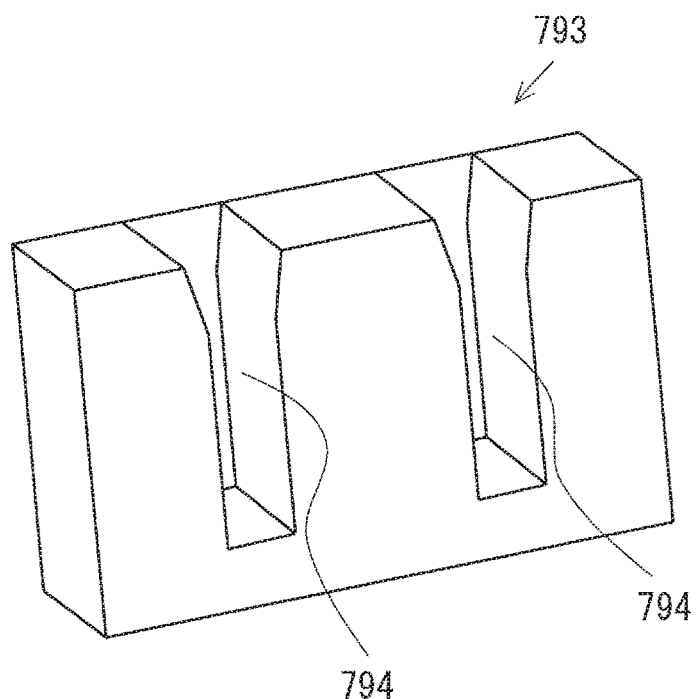
FIG. 21 is a perspective view for showing the positioning member 793 in accordance with the embodiment of the present invention.
Figure 22:
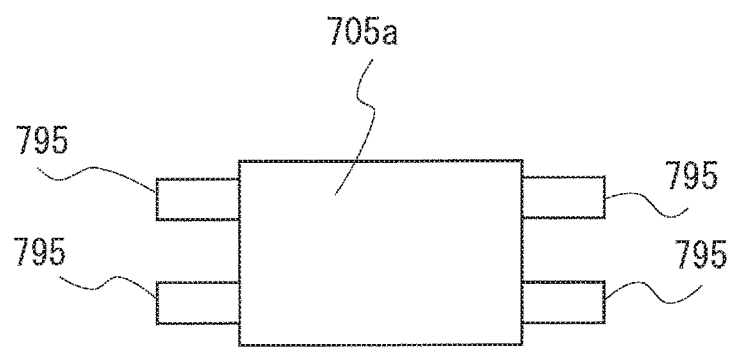
FIG. 22 is a plan view for showing shaft members 795 provided on the first calibration member 705a in accordance with the embodiment of the present invention.
Figure 23:
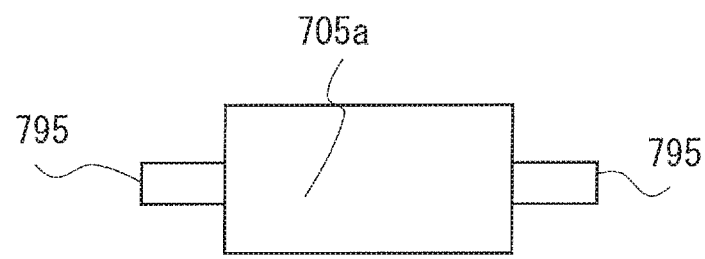
FIG. 23 is a side view for showing the shaft members 795 provided on the first calibration member 705a in accordance with the embodiment of the present invention.
Figure 24:
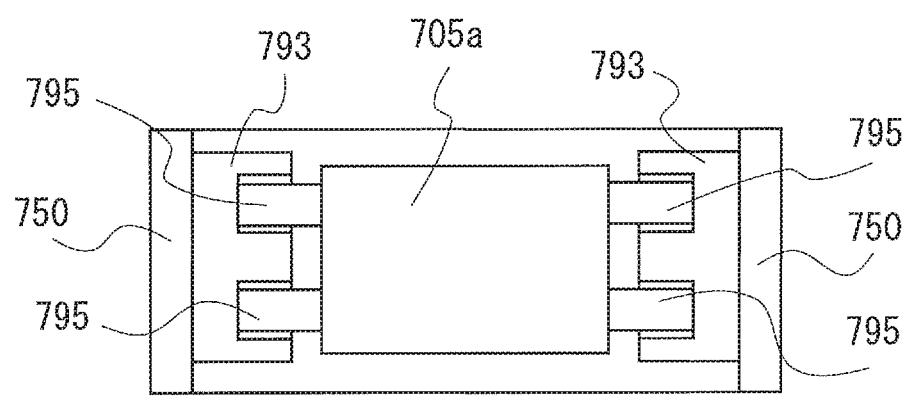
FIG. 24 is a plan view for showing the first calibration member 705a positioned by the positioning members 793 in accordance with the embodiment of the present invention.
Figure 25:
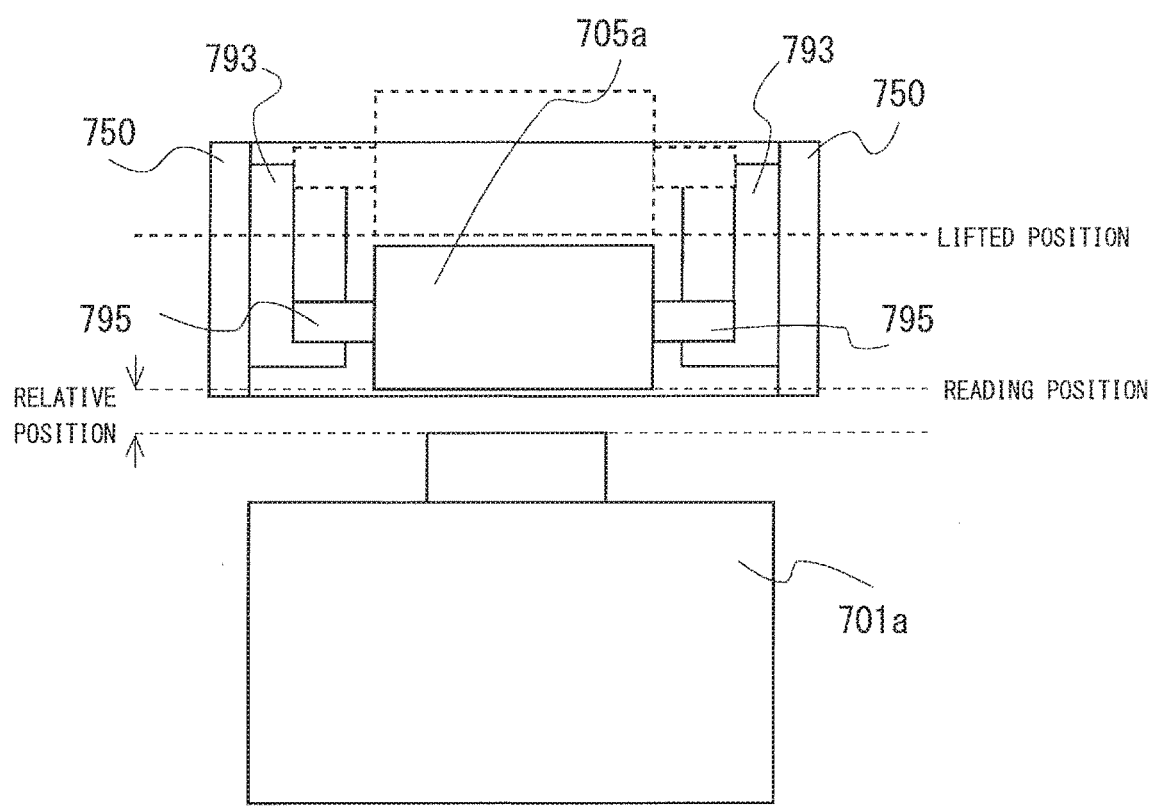
FIG. 25 is a side sectional view for showing the first calibration member 705a positioned by the positioning members 793 in accordance with the embodiment of the present invention.

FIG. 20 is a side sectional view for showing the positioning members 793 in accordance with the embodiment of the present invention. FIG. 21 is a perspective view for showing the positioning member 793 in accordance with the embodiment of the present invention. FIG. 22 is a plan view for showing shaft members 795 provided on the first calibration member 705a in accordance with the embodiment of the present invention. FIG. 23 is a side view for showing the shaft members 795 provided on the first calibration member 705a in accordance with the embodiment of the present invention. FIG. 24 is a plan view for showing the first calibration member 705a positioned by the positioning members 793 in accordance with the embodiment of the present invention. FIG. 25 is a side sectional view for showing the first calibration member 705a positioned by the positioning members 793 in accordance with the embodiment of the present invention.

As shown in FIGS. 19 through 25, the separation unit 760 is provided with the positioning members 793. As shown in FIGS. 19 and 20, the positioning members 793 are provided in the conveyance unit 750. As shown in FIG. 21, the positioning member 793 is provided with guide sections 794. The guide sections 794 guide the first calibration member 705a in the reading position of the first scanner 701a.

As shown in FIGS. 22 through 24, the first calibration member 705a is provided with the shaft members 795. The shaft members 795 are guided to the reading position of the first scanner 701a by the guide sections 794. The positioning members 793 determine the positional relationship between the first calibration member 705a and the first scanner 701a.

The reading position of the first scanner 701a is the relative position between the first calibration member 705a and the first scanner 701a as illustrated in FIG. 25.

Namely, when the first calibration member 705a is lowered downward, the positioning members 793 determine the position of the first calibration member 705a in a reading position in which the reading accuracy of the first scanner 701a can be maintained.

By this structure as explained above, the first calibration member 705a is guided in the reading position of the first scanner 701a. Next is an explanation of the structure in which the relative position between the first calibration member 705a and the first scanner 701a is maintained even when vibration is transmitted to the first calibration member 705a.

Figure 26:
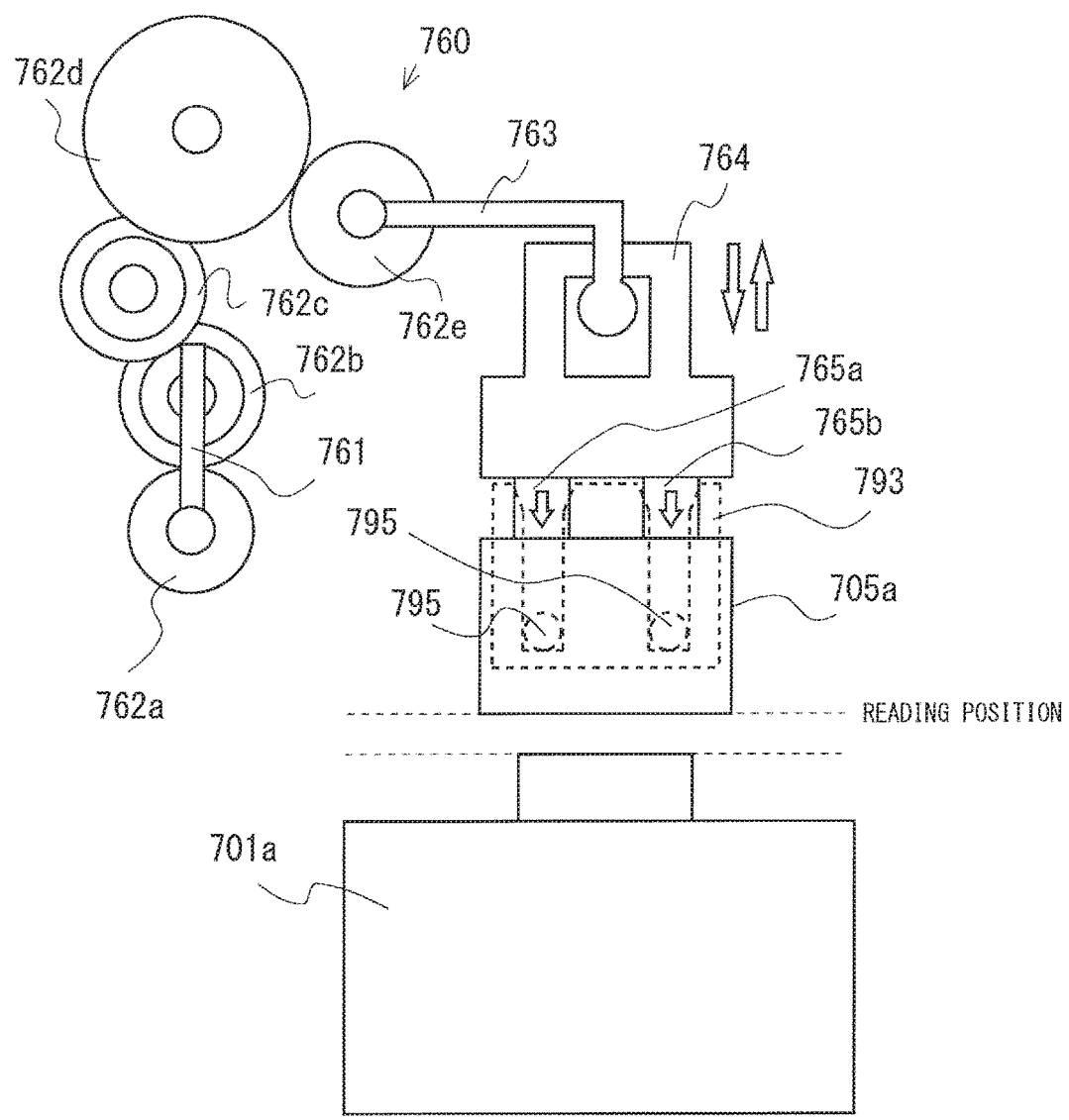
FIG. 26 is a front view for showing the separation unit 760 positioned by the positioning members 793 in accordance with the embodiment of the present invention.
Figure 27:
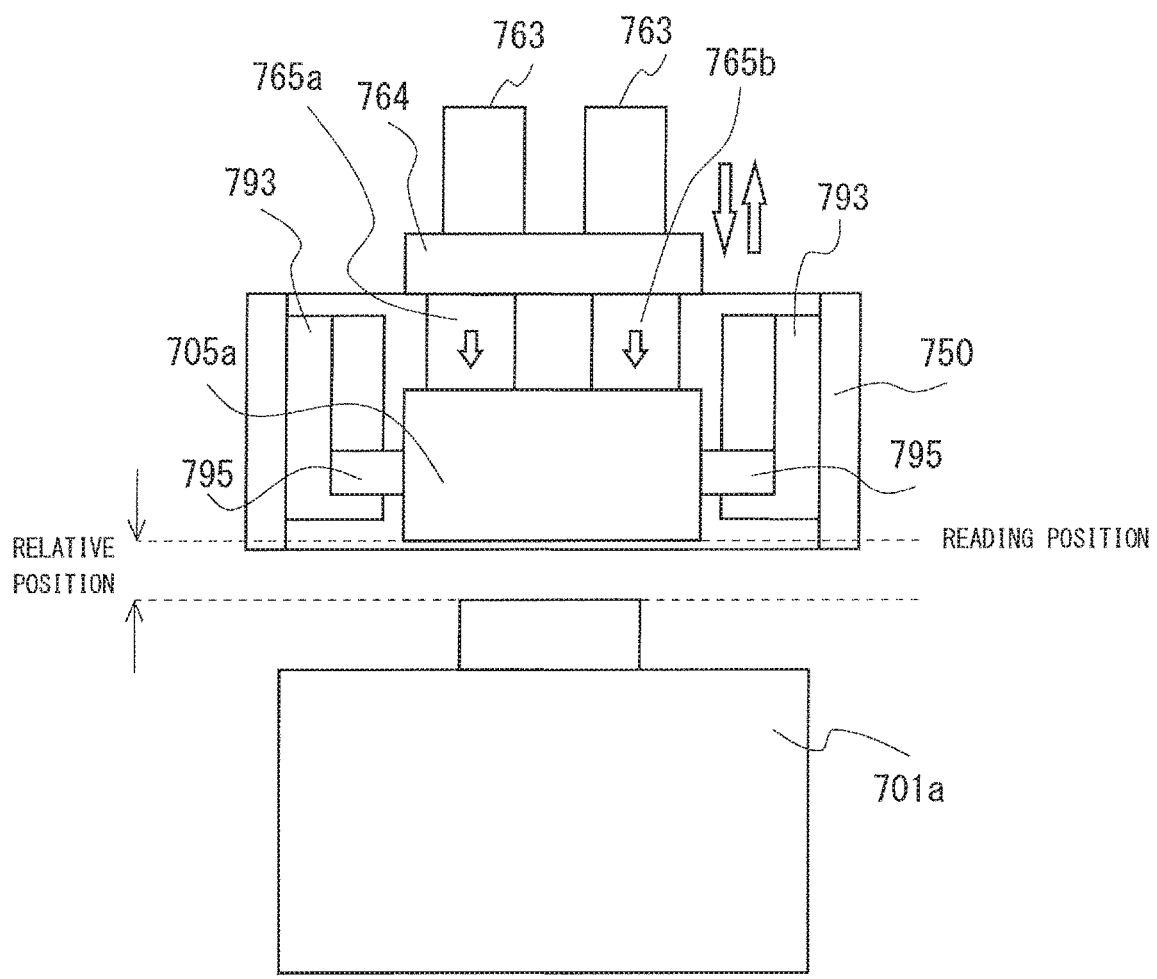
FIG. 27 is a side sectional view for showing the separation unit 760 positioned by the positioning members 793 in accordance with the embodiment of the present invention.

FIG. 26 is a front view for showing the separation unit 760 positioned by the positioning members 793 in accordance with the embodiment of the present invention. FIG. 27 is a side sectional view for showing the separation unit 760 positioned by the positioning members 793 in accordance with the embodiment of the present invention.

As shown in FIGS. 26 and 27, the separation unit 760 is provided with the intervening member 764 and resilient members 765a and 765b. The intervening member 764 is located between the support members 763 and the first calibration member 705a to transmit motion of the support members 763 to the first calibration member 705a. The resilient members 765a and 765b are located between the intervening member 764 and the first calibration member 705a to cancel motion of the first calibration member 705a. Incidentally, the resilient members 765a and 765b are collectively referred to simply as the resilient member 765.

The resilient member 765 consists of a material capable of exerting a restoring force by a resilient force. The resilient member 765 consists, for example, of a spring. When the support members 763 push the intervening member 764 downward, the resilient member 765 is compressed to urge the first calibration member 705a in the gravity direction by the restoring force of the resilient member 765. Accordingly, even when vibration is transmitted during conveying a sheet P, the first calibration member 705a can maintain the relative position to the first scanner 701a by the restoring force of the resilient member 765.

Incidentally, the first calibration member 705a can be maintained in the reading position of the first scanner 701a by closing the lid of the image reading apparatus 7. When the lid of the image reading apparatus 7 is closed, as illustrated in FIG. 8, the drive section 801 pushes the metal plate 802 to rotate the lock member 803 in the clockwise direction around the axle member 804. The stopper member 805 fixed to the shaft of the transmission member 762a is thereby engaged with the lock member 803 so that the shaft of the transmission member 762a can no longer rotate. As a result, the support members 763 continue pushing the first calibration member 705a downward to maintain the relative position between the first calibration member 705a and the first scanner 701a.

Figure 28:
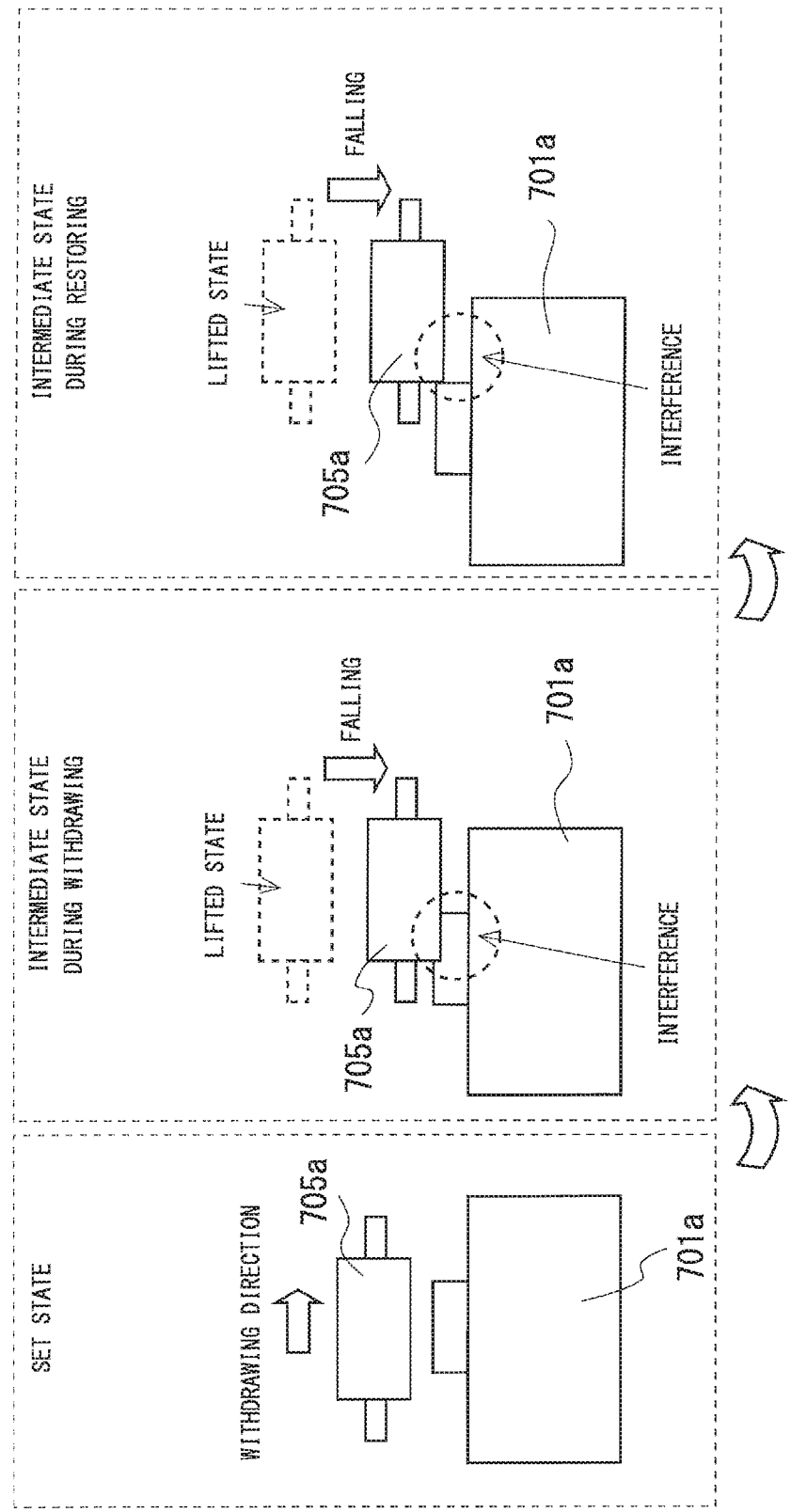
Figure 29:
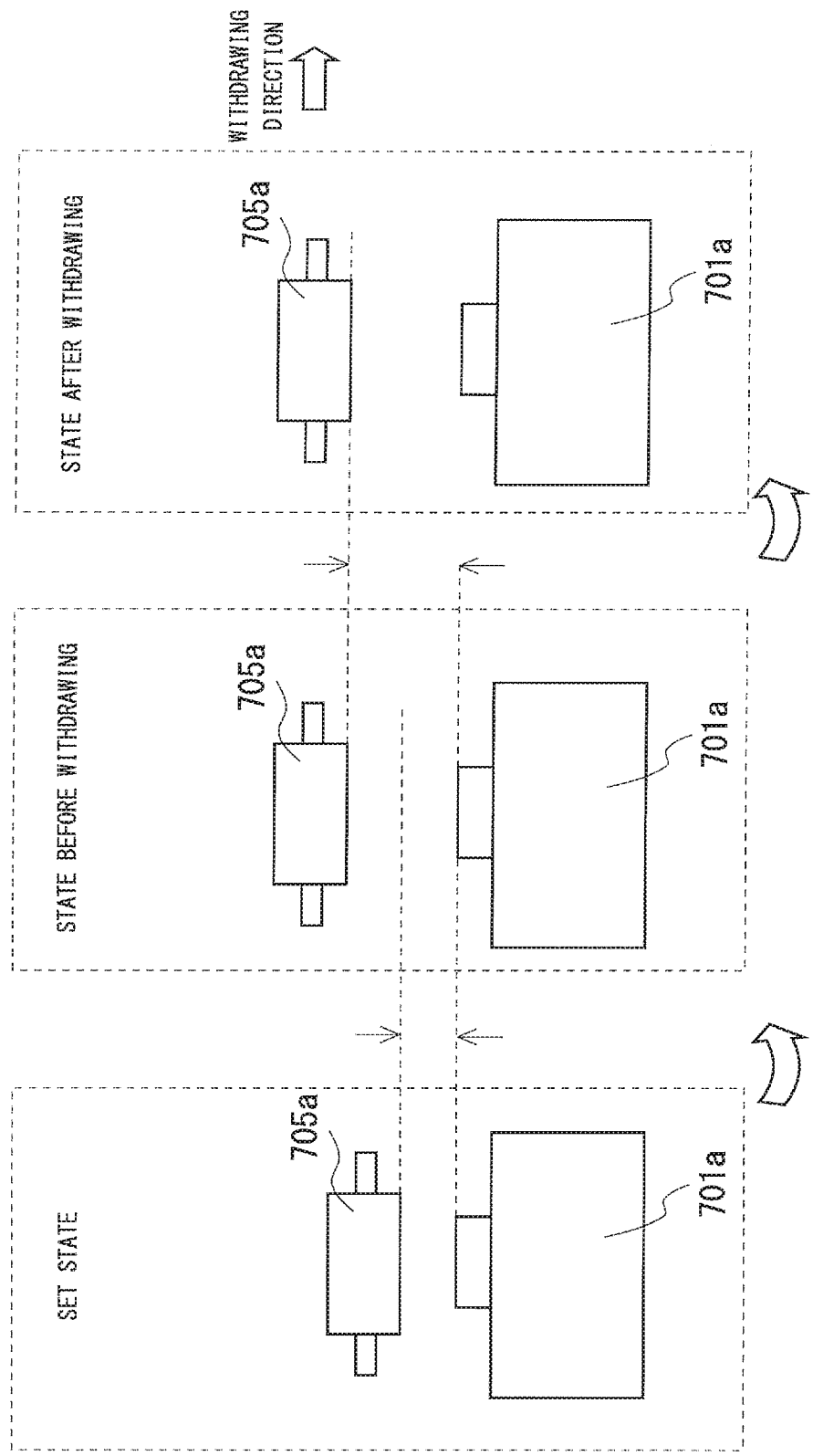
FIG. 29 is a view for explaining the situation in which is expanded the distance between the first scanner 701a and the first calibration member 705a of the embodiment of the present invention.

Next is an explanation of the working effects of the present embodiment in comparison with a prior art example. FIG. 28 is a view for explaining collision of the first calibration member 705a of the embodiment of the present invention with the first scanner 701a. FIG. 29 is a view for explaining the situation in which is expanded the distance between the first scanner 701a and the first calibration member 705a of the embodiment of the present invention.

Figure 30:
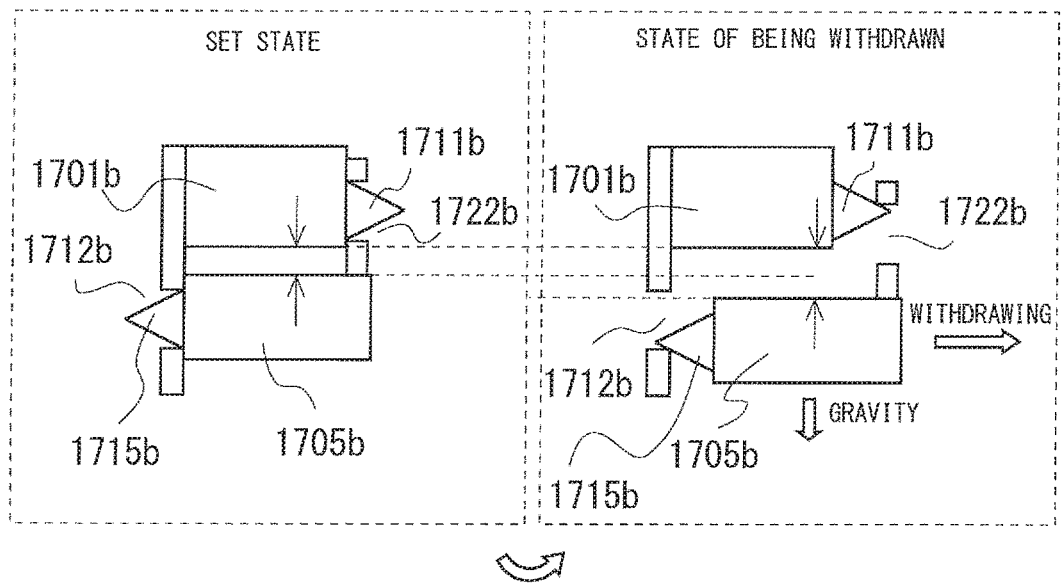
FIG. 30 is a schematic diagram for showing an example of variation in the distance between a second scanner 1701b and a second calibration member 1705b located below the second scanner 1701b when withdrawing the second calibration member 1705b in accordance with a prior art example.
Figure 31:
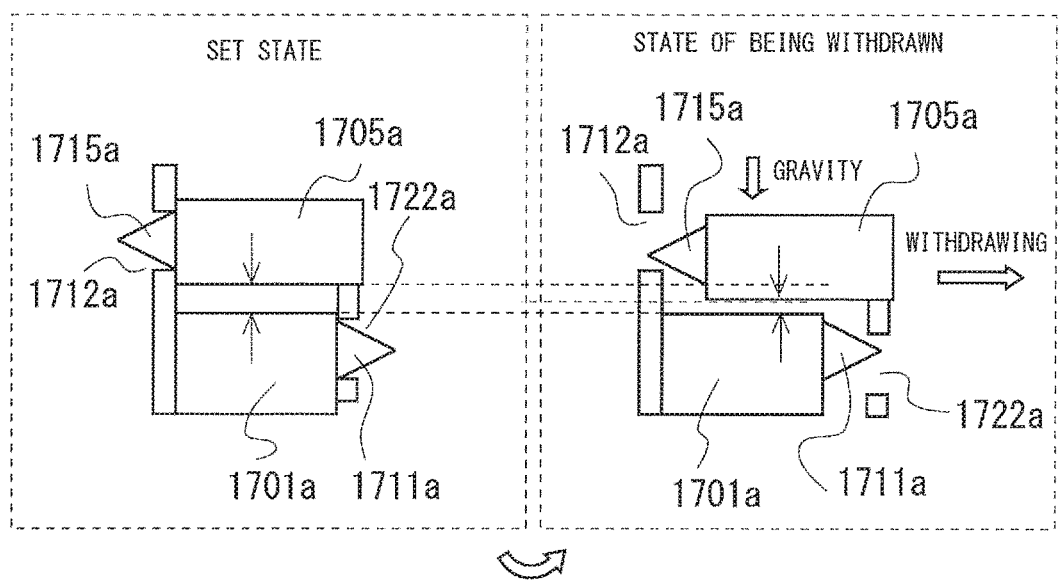
FIG. 31 is a schematic diagram for showing an example of variation in the distance between a first scanner 1701*a* and a first calibration member 1705*a* located above the first scanner 1701*a* when withdrawing the first calibration member 1705*a* in accordance with the prior art example.

FIG. 30 is a schematic diagram for showing an example of variation in the distance between a second scanner 1701b and a second calibration member 1705b located below the second scanner 1701b when withdrawing the second calibration member 1705b in accordance with a prior art example. FIG. 31 is a schematic diagram for showing an example of variation in the distance between a first scanner 1701a and a first calibration member 1705a located above the first scanner 1701a when withdrawing the first calibration member 1705a in accordance with the prior art example.

As shown in FIG. 28, when the first calibration member 705a is lowered during withdrawing the conveyance unit 750, there occurs interference between the first calibration member 705a and the first scanner 701a. This is true during restoring the conveyance unit 750.

In accordance with the prior art example, as illustrated in FIG. 30, the second calibration member 1705b and the second scanner 1701b are positioned and linked by engaging tapered shafts 1711b and 1715b with openings 1712b and 1722b respectively. Accordingly, when withdrawing the second calibration member 1705b, the second calibration member 1705b moves away from the second scanner 1701b by its own weight.

Also, in accordance with the prior art example, as illustrated in FIG. 31, the first calibration member 1705a and the first scanner 1701a are positioned and linked by engaging tapered shafts 1711a and 1715a with openings 1712a and 1722a. Accordingly, when withdrawing the first calibration member 1705a, the first calibration member 1705a approaches the first scanner 1701a by its own weight so that the first calibration member 1705a and the first scanner 1701a may interfere with each other.

FIG. 31 shows the structure in which the first scanner 1701a is located below the first calibration member 1705a. This structure is provided for the purpose of realizing a reading structure with high productivity by reading the front and back sides of a sheet P through a single pass. Incidentally, the first scanner 1701a and the second scanner 1701b are collectively referred to simply as the scanner 1701 when they need not be distinguished.

As explained above, either scanner 1701 has to be located below the conveying route 700 in order to realize such a 1-pass reading structure. In the case of the structure shown in FIG. 31, the first calibration member 1705a may interfere with the first scanner 1701a. Accordingly, vibration may influence the operation of a CCD, which is a constituent element of the first scanner 1701a, to cause flickers of an image on the reading result of the first scanner 1701a.

A desirable structure is thereby such that the first calibration member 705a is lifted when withdrawing the conveyance unit 750 as illustrated in FIG. 29.

Specifically, as illustrated in FIG. 4, this structure is such that the first scanner 701a is provided in order not to be directly linked with the first calibration member 705a arranged to face the first scanner 701a. Flicker do thereby not appear in a read image because vibration due to rotation of the first calibration member 705a, vibration occurring when a sheet P collides with the first calibration member 705a, vibration occurring when a sheet P collides with the conveying route 700 or the like vibration are not transmitted to the scanner 701a. It is therefore possible to prevent the reading accuracy of the first scanner 701a from being lowered and the image quality being degraded.

Furthermore, since the separation unit 760 secures the relative position between the first scanner 701a and the first calibration member 705a, as illustrated in FIGS. 25 through 27, the first calibration member 705a connected to the conveyance unit 750 does not come in contact with the first scanner 701a connected to the housing 710. It is therefore possible during withdrawing the conveyance unit 750 to prevent interference between the first calibration member 705a connected to the conveyance unit 750 and the first scanner 701a connected to the housing 710.

Meanwhile, in the case where the first calibration member 705a is separated from the first scanner 701a by drawing the first calibration member 705a upward obliquely, there has to be reserved a certain space in the apparatus to increase the whole size of the apparatus for the purpose of preventing the first calibration member 705a from interfering with a member located upward obliquely. In accordance with the present embodiment, enlargement of the entire apparatus is avoided by withdrawing the first calibration member 705a in the horizontal direction. Enlargement of the entire apparatus can thereby be avoided.

Also, as shown in FIGS. 3 and 4, since a sheet P is conveyed through the conveying route 700 to read images formed on the first and second sides of the sheet P respectively and colorimetrically measure either of the images formed on the first and second sides of the sheet P, it is possible to automatically correct the image while keeping high productivity.

Furthermore, as shown in FIGS. 9 and 10, since the first calibration member 705a can be moved upward or downward through the transmission section 762 by the operation of the operation section 761 to maintain the first calibration member 705a separated from the first scanner 701a, it is possible to prevent the first calibration member 705a from landing the first scanner 701a by its own weight.

Still further, when it is detected that there is no sheet P at either the entrance side or the exit side of the conveying route 700 respectively, as illustrated in FIG. 8, the operation of the operation section 761 becomes possible to enable the withdrawal operation of the conveyance unit 750 so that it is possible to prevent a sheet P from being jammed between the conveying route 700 and the housing 710 when withdrawing the conveyance unit 750.

Also, as shown in FIGS. 11 through 14, since connection between the conveyance unit 750 and the housing 710 is changed to either a locked state or an unlocked state in response to the operation of the operation section 761 to make it possible to withdraw the conveyance unit 750 together with the first calibration member 705a from the housing 710, it is possible to perform jam handling without touching the first scanner 701a.

Furthermore, when the first calibration member 705a is moved upward, as illustrated in FIGS. 15 through 18, the separation lock section 773 locks the transmission section 762 to make it possible to withdraw the conveyance unit 750, while maintaining the separation state between the first calibration member 705a and the first scanner 701a, so that it is possible to perform the first calibration member 705a from interfering with the first scanner 701a.

Still further, as shown in FIGS. 19 through 25, since the relative distance between the first scanner 701a and the first calibration member 705a is maintained to determine the position of the first calibration member 705a in a reading position in which the reading accuracy of the first scanner 701a can be maintained, it is possible to maintain the image reading quality of the first scanner 701a.

Still further, as shown in FIGS. 26 and 27, even when the first calibration member 705a vibrates during the operation of conveying a sheet P, the position of the first calibration member 705a is maintained in the reading position of the first scanner 701a by canceling the motion of the first calibration member 705a with the resilient member 765, and therefore it is possible to particularly remarkably prevent the image quality from being degraded due to the vibration.

Still further, the reading result of the first scanner 701a or the second scanner 701b is associated with the colorimetric measurement result of the spectrophotometer 703 to obtain the correlation between the colorimetric measurement result of the spectrophotometer 703 and the reading result of the first scanner 701a or the second scanner 701b, and therefore it is possible to correct the reading result based on the correlation.

The image forming apparatus 5 and the image reading apparatus 7 have been explained based on the embodiment in accordance with the present invention. However, it is not intended to limit the present invention to the precise form described, and obviously many modifications and variations are possible without departing from the scope of the invention.

For example, while a sheet P is conveyed in a horizontal direction, and the spectrophotometer 703 and the calibration member 705 are located above and below the sheet P respectively in accordance with the examples of the above embodiment, the present invention is not limited thereto. For example, a sheet P can be conveyed in the vertical direction, and the spectrophotometer 703 and the calibration member 705 can be located on the right and left of the sheet P respectively.

Also, while the image reading signal Sout of the above embodiment is given as digital image data (RGB code) defined in the RGB color space, it is not limited thereto but can be defined in another color space such as the L*a*b* color space.

Furthermore, while the intermediate transfer section 620 is implemented with the second transfer roller 623 in the above example, the present invention is not limited thereto. For example, it is possible to employ a so-called belt-type second transfer unit consisting of a second transfer belt (not shown in the figure) which is wound around a plurality of support rollers including the second transfer roller 623 in the form of a loop.

Still further, the operation section 761 consists of a lever in the above example, the present invention is not limited thereto. For example, the operation section 761 can consist of a button. Still further, the operation section 761 can consist of a liquid crystal display incorporating a touch panel.

What is claimed is:

1. An image reading apparatus which conveys a sheet having a first side facing upward and a second side facing downward along a conveying route formed in a housing, and reads an image formed on the sheet, the image reading apparatus comprising:
   a first scanner provided in the housing, arranged below the conveying route, and structured to read an image formed on the second side of the sheet;
   a conveyance unit provided in the housing, and capable of being withdrawn from the housing; and
   a first calibration member connected to the conveyance unit, arranged above the first scanner, and structured to reflect light which is radiated from the first scanner,
   wherein the conveyance unit is provided with a separation unit which separates the first calibration member upward from the first scanner, and
   wherein when the first calibration member is separated, the separation unit releases connection between the conveyance unit and the housing.

2. The image reading apparatus of claim 1, further comprising:
   a second scanner arranged above the conveying route and structured to read an image formed on the first side of the sheet; and
   a second calibration member arranged below the second scanner, and structured to reflect light which is radiated from the second scanner,
   wherein the first scanner and the first calibration member are located in either one of an upstream side and a downstream side of the conveying route, and
   wherein the second scanner and the second calibration member are located in the other of the upstream side and the downstream side of the conveying route.

3. The image reading apparatus of claim 2, wherein the separation unit comprises:
   an operation member;
   a transmission section structured to hold the operation member in order to transmit an operation of the operation member; and
   a support member structured to support the first calibration member, and move the first calibration member upward or downward in response to the operation of the operation member transmitted through the transmission section.

4. The image reading apparatus of claim 3, further comprising:
   detection sections located at both an entrance side and an exit side of the conveying route to detect existence of a sheet,
   wherein the separation unit further comprises an operation lock section which sets the operation member in either one of a state which makes it possible to operate the operation member and a state which makes it impossible to operate the operation member, and
   wherein the operation lock section makes it possible to operate the operation member when the detection sections detect that there is no sheet at either the entrance side or the exit side of the conveying route respectively.

5. The image reading apparatus of claim 4, further comprising:
   a unit lock section provided between the housing and the conveyance unit, and structured to change the connection between the conveyance unit and the housing to either a locked state or an unlocked state in response to the operation of the operation member,
   wherein when the first calibration member is moved upward by the operation of the operation member, the unit lock section changes the connection between the conveyance unit and the housing to the unlocked state.

6. The image reading apparatus of claim 3, wherein the separation unit further comprises a separation lock section which changes the transmission section to a locked state when the first calibration member is moved upward.

7. The image reading apparatus of claim 3, wherein the separation unit further comprises a positioning member which determines a positional relationship between the first calibration member and the first scanner, and
   wherein when the first calibration member is lowered downward, the positioning member determines a position of the first calibration member in a reading position in which reading accuracy of the first scanner is maintained.

8. The image reading apparatus of claim 7, wherein the positioning member is provided with a guide section which guides the first calibration member to the reading position of the first scanner,
   wherein the first calibration member is provided with a shaft member which is guided to the reading position along the guide section, and
   wherein the separation unit further comprises:
      an intervening member located between the support member and the first calibration member to transmit motion of the support member to the first calibration member; and
      a resilient member located between the intervening member and the first calibration member to cancel motion of the first calibration member.

9. The image reading apparatus of claim, 1 further comprising:
   a spectrophotometer structured to colorimetrically measure an image formed on the first side of the sheet,
   wherein a reading result of the first scanner or the second scanner is associated with a colorimetric measurement result of the spectrophotometer.

10. An image forming system comprising:
    the image reading apparatus as recited in claim 1; and
    an image forming apparatus structured to form an image on the first side or the second side of the sheet.

* * * * *